United States Patent
Lockton et al.

(10) Patent No.: US 10,933,319 B2
(45) Date of Patent: *Mar. 2, 2021

(54) GAME OF SKILL PLAYED BY REMOTE PARTICIPANTS UTILIZING WIRELESS DEVICES IN CONNECTION WITH A COMMON GAME EVENT

(71) Applicant: Winview, Inc., Carmel, CA (US)

(72) Inventors: David B. Lockton, Redwood City, CA (US); Mark K. Berner, Santa Clara, CA (US); Mark J. Micheli, San Francisco, CA (US)

(73) Assignee: Winview, Inc., Redwood City, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/266,081

(22) Filed: Feb. 3, 2019

(65) Prior Publication Data

US 2019/0168114 A1      Jun. 6, 2019

Related U.S. Application Data

(63) Continuation of application No. 11/298,901, filed on Dec. 9, 2005, now Pat. No. 10,226,698, which is a
(Continued)

(51) Int. Cl.
*A63F 13/30* (2014.01)
*A63F 13/65* (2014.01)
(Continued)

(52) U.S. Cl.
CPC .............. *A63F 13/30* (2014.09); *A63F 13/46* (2014.09); *A63F 13/65* (2014.09); *A63F 13/795* (2014.09);
(Continued)

(58) Field of Classification Search
CPC ... A63F 13/12; A63F 2300/8011; A63F 13/30
(Continued)

(56) References Cited

U.S. PATENT DOCUMENTS

| 2,831,105 A | 4/1958 | Parker |
| 3,562,650 A | 2/1971 | Gossard et al. |

(Continued)

FOREIGN PATENT DOCUMENTS

| CA | 2252074 | 11/1997 |
| CA | 2252021 | 11/1998 |

(Continued)

OTHER PUBLICATIONS

Two Way TV Patent and Filing Map www.twowaytv.com/version4/technologiesitech_patents.asp.
(Continued)

*Primary Examiner* — Omkar A Deodhar
*Assistant Examiner* — Ross A Williams
(74) *Attorney, Agent, or Firm* — Haverstock & Owens LLP

(57) ABSTRACT

A game of skill played simultaneously by several players whereby each participant effectively competes only against players having a similar skill tier to provide a better opportunity to win awards. The system includes a central computer system with each remote participant having a mobile device such as a cell phone. The system also provides for effective promotion or updating to a higher skill tier of successful players of the game. Each skill tier adds complexity which increase point potentials. The game play is relatively easy initially, permitting new users to enjoy success in the game. As the user becomes more skilled and reaches higher tiers prizes increase and game elements become more challenging thus motivating continued play while retaining a player's interest. While players are able to (Continued)

view all scores including those in higher tiers, they will know that players in other tiers had more opportunities to earn points.

35 Claims, 12 Drawing Sheets

Related U.S. Application Data continuation-in-part of application No. 11/166,596, filed on Jun. 24, 2005, now Pat. No. 8,870,639.

(60) Provisional application No. 60/635,221, filed on Dec. 10, 2004, provisional application No. 60/588,273, filed on Jul. 14, 2004.

(51) Int. Cl.
| | | |
|---|---|---|
| *A63F 13/795* | (2014.01) | |
| *A63F 13/46* | (2014.01) | |
| *A63F 13/798* | (2014.01) | |
| *A63F 13/335* | (2014.01) | |
| *A63F 13/332* | (2014.01) | |

(52) U.S. Cl.
CPC .......... *A63F 13/798* (2014.09); *A63F 13/332* (2014.09); *A63F 13/335* (2014.09)

(58) Field of Classification Search
USPC ................................ 463/40–42, 1–6, 30–33
See application file for complete search history.

(56) References Cited

U.S. PATENT DOCUMENTS

| | | |
|---|---|---|
| 4,141,548 A | 2/1979 | Everton |
| 4,270,755 A | 6/1981 | Willhide et al. |
| 4,386,377 A | 5/1983 | Hunter, Jr. |
| 4,496,148 A | 1/1985 | Morstain et al. |
| 4,521,803 A | 6/1985 | Gittinger |
| 4,592,546 A | 6/1986 | Fascenda et al. |
| 4,816,904 A | 3/1989 | McKenna et al. |
| 4,918,603 A | 4/1990 | Hughes et al. |
| 4,930,010 A | 5/1990 | MacDonald |
| 5,013,038 A | 5/1991 | Luvenberg |
| 5,018,736 A | 5/1991 | Pearson et al. |
| 5,035,422 A | 7/1991 | Berman |
| 5,073,931 A | 12/1991 | Audebert et al. |
| 5,083,271 A | 1/1992 | Thatcher et al. |
| 5,083,800 A | 1/1992 | Lockton |
| 5,119,295 A | 6/1992 | Kapur |
| 5,120,076 A | 6/1992 | Luxenberg et al. |
| 5,213,337 A | 5/1993 | Sherman |
| 5,227,874 A | 7/1993 | Von Kohorn |
| 5,256,863 A | 10/1993 | Ferguson |
| 5,263,723 A | 11/1993 | Pearson et al. |
| 5,283,734 A | 2/1994 | Von Kohorn |
| 5,327,485 A | 7/1994 | Leaden |
| 5,343,236 A | 8/1994 | Koppe et al. |
| 5,343,239 A | 8/1994 | Lappington et al. |
| 5,417,424 A | 5/1995 | Snowden |
| 5,462,275 A | 10/1995 | Lowe et al. |
| 5,479,492 A | 12/1995 | Hofstee et al. |
| 5,488,659 A | 1/1996 | Miliani |
| 5,519,433 A | 5/1996 | Lappington |
| 5,530,483 A | 6/1996 | Cooper |
| 5,553,120 A | 9/1996 | Katz |
| 5,566,291 A | 10/1996 | Boulton et al. |
| 5,585,975 A | 12/1996 | Bliss |
| 5,586,257 A | 12/1996 | Perlman |
| 5,589,765 A | 12/1996 | Ohmart et al. |
| 5,594,938 A | 1/1997 | Engel |
| 5,618,232 A | 4/1997 | Martin |
| 5,628,684 A | 5/1997 | Jean-Etienne |
| 5,636,920 A | 6/1997 | Shur et al. |
| 5,638,113 A | 6/1997 | Lappington |
| 5,643,088 A | 7/1997 | Vaughn et al. |
| 5,663,757 A | 9/1997 | Morales |
| 5,759,101 A | 6/1998 | Won Kohorn |
| 5,761,606 A | 6/1998 | Wolzien |
| 5,762,552 A | 6/1998 | Voung et al. |
| 5,764,275 A | 6/1998 | Lappington et al. |
| 5,794,210 A | 8/1998 | Goldhaber et al. |
| 5,805,230 A | 9/1998 | Staron |
| 5,813,913 A | 9/1998 | Berner et al. |
| 5,818,438 A | 10/1998 | Howe et al. |
| 5,828,843 A | 10/1998 | Grimm |
| 5,838,774 A | 11/1998 | Weiser, Jr. |
| 5,846,132 A | 12/1998 | Junkin |
| 5,848,397 A | 12/1998 | Marsh et al. |
| 5,860,862 A | 1/1999 | Junkin |
| 5,894,556 A | 4/1999 | Grimm |
| 5,916,024 A | 6/1999 | Von Kohorn |
| 5,870,683 A | 9/1999 | Wells et al. |
| 5,970,143 A | 10/1999 | Schneier et al. |
| 5,971,854 A | 10/1999 | Pearson et al. |
| 5,987,440 A | 11/1999 | O'Neil et al. |
| 6,009,458 A | 12/1999 | Hawkins et al. |
| 6,015,344 A | 1/2000 | Kelly et al. |
| 6,016,337 A | 1/2000 | Pykalisto |
| 6,042,477 A | 3/2000 | Addink |
| 6,064,449 A | 5/2000 | White |
| 6,104,815 A | 8/2000 | Alcorn et al. |
| 6,110,041 A | 8/2000 | Walker et al. |
| 6,117,013 A | 9/2000 | Elba |
| 6,126,543 A | 10/2000 | Friedman |
| 6,128,660 A | 10/2000 | Grimm |
| 6,135,881 A | 10/2000 | Abbott et al. |
| 6,174,237 B1 | 1/2001 | Stephenson |
| 6,182,084 B1 | 1/2001 | Cockrell et al. |
| 6,193,610 B1 | 2/2001 | Junkin |
| 6,222,642 B1 | 4/2001 | Farrell et al. |
| 6,233,736 B1 | 5/2001 | Wolzien |
| 6,251,017 B1 | 6/2001 | Leason et al. |
| 6,267,670 B1 | 7/2001 | Walker |
| 6,287,199 B1 | 9/2001 | McKeown et al. |
| 6,293,868 B1 | 9/2001 | Bernard |
| 6,312,336 B1 | 11/2001 | Handelman et al. |
| 6,345,297 B1 | 2/2002 | Grimm |
| 6,371,855 B1 | 4/2002 | Gavriloff |
| 6,373,462 B1 | 4/2002 | Pan |
| 6,411,969 B1 | 6/2002 | Tam |
| 6,416,414 B1 | 7/2002 | Stadelmann |
| 6,425,828 B2 | 7/2002 | Walker et al. |
| 6,434,398 B1 | 8/2002 | Inselberg |
| 6,470,180 B1 | 10/2002 | Kotzin et al. |
| 6,475,090 B2 | 11/2002 | Gregory |
| 6,524,189 B1 | 2/2003 | Rautila |
| 6,527,641 B1 | 3/2003 | Sinclair et al. |
| 6,530,082 B1 | 3/2003 | Del Sesto et al. |
| 6,536,037 B1 | 3/2003 | Guheen et al. |
| 6,578,068 B1 | 6/2003 | Bowma-Amuah |
| 6,594,098 B1 | 7/2003 | Sutardja |
| 6,604,997 B2 | 7/2003 | Saidakovsky et al. |
| 6,610,953 B1 | 8/2003 | Tao et al. |
| 6,611,755 B1 | 8/2003 | Coffee |
| 6,648,760 B1 | 11/2003 | Nicastro |
| 6,659,860 B1 | 12/2003 | Yamamoto et al. |
| 6,659,861 B1 | 12/2003 | Faris |
| 6,659,872 B1 | 12/2003 | Kaufman et al. |
| 6,690,661 B1 | 2/2004 | Agarwal et al. |
| 6,718,350 B1 | 4/2004 | Karbowski |
| 6,752,396 B2 | 6/2004 | Smith |
| 6,758,754 B1 | 7/2004 | Lavanchy et al. |
| 6,758,755 B2 | 7/2004 | Kelly et al. |
| 6,760,595 B2 | 7/2004 | Insellberg |
| 6,763,377 B1 | 7/2004 | Balknap et al. |
| 6,766,524 B1 | 7/2004 | Matheny et al. |
| 6,774,926 B1 | 8/2004 | Ellis et al. |
| 6,785,561 B1 | 8/2004 | Kim |
| 6,801,380 B1 | 10/2004 | Saturdja |
| 6,806,889 B1 | 10/2004 | Malaure et al. |
| 6,807,675 B1 | 10/2004 | Millard et al. |
| 6,811,482 B2 | 11/2004 | Letovsky |

(56) References Cited

U.S. PATENT DOCUMENTS

| | | |
|---|---|---|
| 6,811,487 B2 | 11/2004 | Sengoku |
| 6,816,628 B1 | 11/2004 | Sarachik et al. |
| 6,817,947 B2 | 11/2004 | Tanskanen |
| 6,824,469 B2 | 11/2004 | Allibhoy et al. |
| 6,837,789 B2 | 1/2005 | Garahi et al. |
| 6,837,791 B1 | 1/2005 | McNutt et al. |
| 6,840,861 B2 | 1/2005 | Jordan et al. |
| 6,845,389 B1 | 1/2005 | Sen |
| 6,846,239 B2 | 1/2005 | Washio |
| 6,857,122 B1 | 2/2005 | Takeda et al. |
| 6,863,610 B2 | 3/2005 | Vancraeynest |
| 6,870,720 B2 | 3/2005 | Iwata et al. |
| 6,871,226 B1 | 3/2005 | Ensley et al. |
| 6,873,610 B1 | 3/2005 | Noever |
| 6,884,166 B2 | 4/2005 | Leen et al. |
| 6,884,172 B1 | 4/2005 | Lloyd et al. |
| 6,887,159 B2 | 5/2005 | Leen et al. |
| 6,888,929 B1 | 5/2005 | Saylor |
| 6,893,347 B1 | 5/2005 | Zilliacus et al. |
| 6,898,762 B2 | 5/2005 | Ellis et al. |
| 6,899,628 B2 | 5/2005 | Leen et al. |
| 6,903,681 B2 | 6/2005 | Faris |
| 6,908,389 B1 | 6/2005 | Puskala |
| 6,942,574 B1 | 9/2005 | LeMay et al. |
| 6,944,228 B1 | 9/2005 | Dakss et al. |
| 6,960,088 B1 | 11/2005 | Long |
| 6,978,053 B1 | 12/2005 | Sarachik et al. |
| 7,001,279 B1 | 2/2006 | Barber et al. |
| 7,029,394 B2 | 4/2006 | Leen et al. |
| 7,035,626 B1 | 4/2006 | Luciano, Jr. |
| 7,035,653 B2 | 4/2006 | Simon et al. |
| 7,058,592 B1 | 6/2006 | Heckerman et al. |
| 7,076,434 B1 | 7/2006 | Newnam et al. |
| 7,085,552 B2 | 8/2006 | Buckley |
| 7,116,310 B1 | 10/2006 | Evans et al. |
| 7,117,517 B1 | 10/2006 | Milazzo et al. |
| 7,120,924 B1 | 10/2006 | Katcher et al. |
| 7,125,336 B2 | 10/2006 | Anttila et al. |
| 7,136,871 B2 | 11/2006 | Ozer et al. |
| 7,144,011 B2 | 12/2006 | Asher et al. |
| 7,169,050 B1 | 1/2007 | Tyler |
| 7,191,447 B1 | 3/2007 | Ellis et al. |
| 7,192,352 B2 | 3/2007 | Walker et al. |
| 7,194,758 B1 | 3/2007 | Waki et al. |
| 7,228,349 B2 | 6/2007 | Barone, Jr. et al. |
| 7,231,630 B2 | 6/2007 | Acott et al. |
| 7,233,922 B2 | 6/2007 | Asher et al. |
| 7,240,093 B1 | 7/2007 | Danieli et al. |
| 7,244,181 B2 | 7/2007 | Wang et al. |
| 7,249,367 B2 | 7/2007 | Bove, Jr. et al. |
| 7,254,605 B1 | 8/2007 | Strum |
| 7,260,782 B2 | 8/2007 | Wallace et al. |
| RE39,818 E | 9/2007 | Slifer |
| 7,283,830 B2 | 10/2007 | Buckley |
| 7,288,027 B2 | 10/2007 | Overton |
| 7,341,517 B2 | 3/2008 | Asher et al. |
| 7,343,617 B1 | 3/2008 | Kartcher et al. |
| 7,347,781 B2 | 3/2008 | Schultz |
| 7,351,149 B1 | 4/2008 | Simon et al. |
| 7,367,042 B1 | 4/2008 | Dakss et al. |
| 7,379,705 B1 | 5/2008 | Rados et al. |
| 7,389,144 B1 | 6/2008 | Osorio |
| 7,430,718 B2 | 9/2008 | Gariepy-Viles |
| 7,452,273 B2 | 11/2008 | Amaitis et al. |
| 7,460,037 B2 | 12/2008 | Cattone et al. |
| 7,461,067 B2 | 12/2008 | Dewing et al. |
| 7,502,610 B2 | 3/2009 | Maher |
| 7,517,282 B1 | 4/2009 | Pryor |
| 7,534,169 B2 | 5/2009 | Amaitis et al. |
| 7,562,134 B1 | 7/2009 | Fingerhut et al. |
| 7,614,944 B1 | 11/2009 | Hughes et al. |
| 7,630,986 B1 | 12/2009 | Herz et al. |
| 7,693,781 B2 | 4/2010 | Asher et al. |
| 7,699,707 B2 | 4/2010 | Bahou |
| 7,711,628 B2 | 5/2010 | Davie et al. |
| 7,753,772 B1 | 7/2010 | Walker |
| 7,753,789 B2 | 7/2010 | Walker et al. |
| 7,780,528 B2 | 8/2010 | Hirayama |
| 7,828,661 B1 | 11/2010 | Fish |
| 7,835,961 B2 | 11/2010 | Davie et al. |
| 7,886,003 B2 | 2/2011 | Newman |
| 7,907,211 B2 | 3/2011 | Oostveen et al. |
| 7,926,810 B2 | 4/2011 | Fisher et al. |
| 7,937,318 B2 | 5/2011 | Davie et al. |
| 7,976,389 B2 | 7/2011 | Cannon et al. |
| 8,002,618 B1 | 8/2011 | Lockton et al. |
| 8,006,314 B2 | 8/2011 | Wold |
| 8,025,565 B2 | 9/2011 | Leen et al. |
| 8,028,315 B1 | 9/2011 | Barber |
| 8,082,150 B2 | 12/2011 | Wold |
| 8,086,445 B2 | 12/2011 | Wold et al. |
| 8,086,510 B2 | 12/2011 | Amaitis et al. |
| 8,092,303 B2 | 1/2012 | Amaitis et al. |
| 8,105,141 B2 | 1/2012 | Leen et al. |
| 8,107,674 B2 | 1/2012 | Davis et al. |
| 8,109,827 B2 | 2/2012 | Cahill et al. |
| 8,128,474 B2 | 3/2012 | Amaitis et al. |
| 8,147,313 B2 | 4/2012 | Amaitis et al. |
| 8,149,530 B1 | 4/2012 | Lockton et al. |
| 8,176,518 B1 | 5/2012 | Junkin et al. |
| 8,186,682 B2 | 5/2012 | Amaitis et al. |
| 8,204,808 B2 | 6/2012 | Amaitis et al. |
| 8,240,669 B2 | 8/2012 | Asher et al. |
| 8,246,048 B2 | 8/2012 | Amaitis et al. |
| 8,267,403 B2 | 9/2012 | Fisher et al. |
| 8,342,924 B2 | 1/2013 | Leen et al. |
| 8,342,942 B2 | 1/2013 | Amaitis et al. |
| 8,353,763 B2 | 1/2013 | Amaitis et al. |
| 8,376,855 B2 | 2/2013 | Lockton et al. |
| 8,397,257 B1 | 3/2013 | Barber |
| 8,465,021 B2 | 6/2013 | Asher et al. |
| 8,473,393 B2 | 6/2013 | Davie et al. |
| 8,474,819 B2 | 7/2013 | Asher et al. |
| 8,535,138 B2 | 9/2013 | Amaitis et al. |
| 8,538,563 B1 | 9/2013 | Barber |
| 8,543,487 B2 | 9/2013 | Asher et al. |
| 8,555,313 B2 | 10/2013 | Newman |
| 8,556,691 B2 | 10/2013 | Leen et al. |
| 8,585,490 B2 | 11/2013 | Amaitis et al. |
| 8,622,798 B2 | 1/2014 | Lockton et al. |
| 8,638,517 B2 | 1/2014 | Lockton et al. |
| 8,641,511 B2 | 2/2014 | Ginsberg et al. |
| 8,659,848 B2 | 2/2014 | Lockton et al. |
| 8,672,751 B2 | 3/2014 | Leen et al. |
| 8,699,168 B2 | 4/2014 | Lockton et al. |
| 8,705,195 B2 | 4/2014 | Lockton |
| 8,708,789 B2 | 4/2014 | Asher et al. |
| 8,717,701 B2 | 5/2014 | Lockton et al. |
| 8,727,352 B2 | 5/2014 | Amaitis et al. |
| 8,734,227 B2 | 5/2014 | Leen et al. |
| 8,737,004 B2 | 5/2014 | Lockton et al. |
| 8,738,694 B2 | 5/2014 | Huske et al. |
| 8,771,058 B2 | 7/2014 | Alderucci et al. |
| 8,780,482 B2 | 7/2014 | Lockton et al. |
| 8,805,732 B2 | 8/2014 | Davie et al. |
| 8,813,112 B1 | 8/2014 | Cibula et al. |
| 8,814,664 B2 | 8/2014 | Amaitis et al. |
| 8,817,408 B2 | 8/2014 | Lockton et al. |
| 8,837,072 B2 | 9/2014 | Lockton et al. |
| 8,849,225 B1 | 9/2014 | Choti |
| 8,858,313 B1 | 10/2014 | Selfors |
| 8,870,639 B2 | 10/2014 | Lockton et al. |
| 8,935,715 B2 | 1/2015 | Cibula et al. |
| 9,056,251 B2 | 6/2015 | Lockton |
| 9,067,143 B2 | 6/2015 | Lockton et al. |
| 9,069,651 B2 | 6/2015 | Barber |
| 9,076,303 B2 | 7/2015 | Park |
| 9,098,883 B2 | 8/2015 | Asher et al. |
| 9,111,417 B2 | 8/2015 | Leen et al. |
| 9,205,339 B2 | 12/2015 | Cibula et al. |
| 9,233,293 B2 | 1/2016 | Lockton |
| 9,258,601 B2 | 2/2016 | Lockton et al. |
| 9,270,789 B2 | 2/2016 | Huske et al. |
| 9,289,692 B2 | 3/2016 | Barber |

(56) References Cited

U.S. PATENT DOCUMENTS

| | | |
|---|---|---|
| 9,306,952 B2 | 4/2016 | Burman et al. |
| 9,314,686 B2 | 4/2016 | Lockton |
| 9,314,701 B2 | 4/2016 | Lockton et al. |
| 9,355,518 B2 | 5/2016 | Amaitis et al. |
| 9,406,189 B2 | 8/2016 | Scott et al. |
| 9,457,272 B2 | 10/2016 | Lockton et al. |
| 9,498,724 B2 | 11/2016 | Lockton et al. |
| 9,501,904 B2 | 11/2016 | Lockton |
| 9,504,922 B2 | 11/2016 | Lockton et al. |
| 9,511,287 B2 | 12/2016 | Lockton et al. |
| 9,526,991 B2 | 12/2016 | Lockton et al. |
| 9,536,396 B2 | 1/2017 | Amaitis et al. |
| 9,556,991 B2 | 1/2017 | Furuya |
| 9,604,140 B2 | 3/2017 | Lockton et al. |
| 9,652,937 B2 | 5/2017 | Lockton |
| 9,662,576 B2 | 5/2017 | Lockton et al. |
| 9,662,577 B2 | 5/2017 | Lockton et al. |
| 9,672,692 B2 | 6/2017 | Lockton |
| 9,687,738 B2 | 6/2017 | Lockton et al. |
| 9,687,739 B2 | 6/2017 | Lockton et al. |
| 9,707,482 B2 | 7/2017 | Lockton et al. |
| 9,716,918 B1 | 7/2017 | Lockton et al. |
| 9,724,603 B2 | 8/2017 | Lockton et al. |
| 9,744,453 B2 | 8/2017 | Lockton et al. |
| 9,805,549 B2 | 10/2017 | Asher et al. |
| 9,821,233 B2 | 11/2017 | Lockton et al. |
| 9,878,243 B2 | 1/2018 | Lockton et al. |
| 9,881,337 B2 | 1/2018 | Jaycob et al. |
| 9,901,820 B2 | 2/2018 | Lockton et al. |
| 9,908,053 B2 | 3/2018 | Lockton et al. |
| 9,919,210 B2 | 3/2018 | Lockton |
| 9,919,211 B2 | 3/2018 | Lockton et al. |
| 9,919,221 B2 | 3/2018 | Lockton et al. |
| 9,978,217 B2 | 5/2018 | Lockton |
| 9,993,730 B2 | 6/2018 | Lockton et al. |
| 9,999,834 B2 | 6/2018 | Lockton et al. |
| 10,052,557 B2 | 8/2018 | Lockton et al. |
| 10,089,815 B2 | 10/2018 | Asher et al. |
| 10,096,210 B2 | 10/2018 | Amaitis et al. |
| 10,137,369 B2 | 11/2018 | Lockton et al. |
| 10,150,031 B2 | 12/2018 | Lockton et al. |
| 10,165,339 B2 | 12/2018 | Huske et al. |
| 10,186,116 B2 | 1/2019 | Lockton |
| 10,195,526 B2 | 2/2019 | Lockton et al. |
| 10,226,698 B1 | 3/2019 | Lockton et al. |
| 10,226,705 B2 | 3/2019 | Lockton et al. |
| 10,232,270 B2 | 3/2019 | Lockton et al. |
| 10,248,290 B2 | 4/2019 | Galfond |
| 2001/0004609 A1 | 6/2001 | Walker et al. |
| 2001/0005670 A1 | 6/2001 | Lahtinen |
| 2001/0013125 A1 | 8/2001 | Kitsukawa et al. |
| 2001/0020298 A1 | 9/2001 | Rector, Jr. et al. |
| 2001/0032333 A1 | 10/2001 | Flickinger |
| 2001/0036272 A1 | 11/2001 | Hirayama |
| 2001/0036853 A1 | 11/2001 | Thomas |
| 2002/0010789 A1 | 1/2002 | Lord |
| 2002/0026321 A1 | 2/2002 | Faris |
| 2002/0029381 A1 | 3/2002 | Inselberg |
| 2002/0035609 A1 | 3/2002 | Lessard |
| 2002/0037766 A1 | 3/2002 | Muniz |
| 2002/0069265 A1 | 3/2002 | Bountour |
| 2002/0042293 A1 | 4/2002 | Ubale et al. |
| 2002/0046099 A1 | 4/2002 | Frengut et al. |
| 2002/0054088 A1 | 5/2002 | Tanskanen et al. |
| 2002/0055385 A1 | 5/2002 | Otsu |
| 2002/0056089 A1 | 5/2002 | Houston |
| 2002/0059094 A1 | 5/2002 | Hosea et al. |
| 2002/0059623 A1 | 5/2002 | Rodriguez et al. |
| 2002/0069076 A1 | 6/2002 | Faris |
| 2002/0076084 A1 | 6/2002 | Tian |
| 2002/0078176 A1 | 6/2002 | Nomura et al. |
| 2002/0083461 A1 | 6/2002 | Hutcheson |
| 2002/0091833 A1 | 7/2002 | Grimm |
| 2002/0095333 A1 | 7/2002 | Jokinen et al. |
| 2002/0097983 A1 | 7/2002 | Wallace et al. |
| 2002/0099709 A1 | 7/2002 | Wallace |
| 2002/0100063 A1 | 7/2002 | Herigstad et al. |
| 2002/0103696 A1 | 8/2002 | Huang et al. |
| 2002/0105535 A1 | 8/2002 | Wallace et al. |
| 2002/0107073 A1 | 8/2002 | Binney |
| 2002/0108112 A1 | 8/2002 | Wallace et al. |
| 2002/0108125 A1 | 8/2002 | Joao |
| 2002/0108127 A1 | 8/2002 | Lew et al. |
| 2002/0112249 A1 | 8/2002 | Hendricks et al. |
| 2002/0115488 A1 | 8/2002 | Berry et al. |
| 2002/0119821 A1 | 8/2002 | Sen |
| 2002/0120930 A1 | 8/2002 | Yona |
| 2002/0124247 A1 | 9/2002 | Houghton |
| 2002/0132614 A1 | 9/2002 | Vanlujit et al. |
| 2002/0133817 A1 | 9/2002 | Markel |
| 2002/0133827 A1 | 9/2002 | Newman et al. |
| 2002/0142843 A1 | 10/2002 | Roelofs |
| 2002/0144273 A1 | 10/2002 | Reto |
| 2002/0147049 A1 | 10/2002 | Carter, Sr. |
| 2002/0157002 A1 | 10/2002 | Messerges et al. |
| 2002/0157005 A1 | 10/2002 | Brunk |
| 2002/0159576 A1 | 10/2002 | Adams |
| 2002/0162031 A1 | 10/2002 | Levin et al. |
| 2002/0162117 A1 | 10/2002 | Pearson |
| 2002/0165020 A1 | 11/2002 | Koyama |
| 2002/0165025 A1 | 11/2002 | Kawahara |
| 2002/0177483 A1 | 11/2002 | Cannon |
| 2002/0187825 A1 | 12/2002 | Tracy |
| 2002/0198050 A1 | 12/2002 | Patchen |
| 2003/0002638 A1 | 1/2003 | Kaars |
| 2003/0013528 A1 | 1/2003 | Allibhoy et al. |
| 2003/0023547 A1 | 1/2003 | France |
| 2003/0040363 A1 | 2/2003 | Sandberg |
| 2003/0054885 A1 | 3/2003 | Pinto |
| 2003/0060247 A1 | 3/2003 | Goldberg et al. |
| 2003/0066089 A1 | 4/2003 | David Anderson |
| 2003/0069828 A1 | 4/2003 | Blazey et al. |
| 2003/0070174 A1 | 4/2003 | Solomon |
| 2003/0078924 A1 | 4/2003 | Liechty et al. |
| 2003/0086691 A1 | 5/2003 | Yu |
| 2003/0087652 A1 | 5/2003 | Simon et al. |
| 2003/0088648 A1 | 5/2003 | Bellaton |
| 2003/0114224 A1 | 6/2003 | Anttila et al. |
| 2003/0115152 A1 | 6/2003 | Flaherty |
| 2003/0134678 A1 | 7/2003 | Tanaka |
| 2003/0144017 A1 | 7/2003 | Inselberg |
| 2003/0154242 A1 | 8/2003 | Hayes et al. |
| 2003/0165241 A1 | 9/2003 | Fransdonk |
| 2003/0177167 A1 | 9/2003 | Lafage et al. |
| 2003/0177504 A1 | 9/2003 | Paulo et al. |
| 2003/0189668 A1 | 10/2003 | Newman et al. |
| 2003/0195023 A1 | 10/2003 | Di Cesare |
| 2003/0195807 A1 | 10/2003 | Maggio |
| 2003/0208579 A1 | 11/2003 | Brady et al. |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2003/0233425 A1 | 12/2003 | Lyons et al. |
| 2004/0005919 A1 | 1/2004 | Walker et al. |
| 2004/0014524 A1 | 1/2004 | Pearlman |
| 2004/0022366 A1 | 2/2004 | Ferguson et al. |
| 2004/0056897 A1 | 3/2004 | Ueda |
| 2004/0060063 A1 | 3/2004 | Russ et al. |
| 2004/0073915 A1 | 4/2004 | Dureau |
| 2004/0025190 A1 | 5/2004 | McCalla |
| 2004/0088729 A1 | 5/2004 | Petrovic et al. |
| 2004/0093302 A1 | 5/2004 | Baker et al. |
| 2004/0152454 A1 | 5/2004 | Kauppinen |
| 2004/0107138 A1 | 6/2004 | Maggio |
| 2004/0117831 A1 | 6/2004 | Ellis et al. |
| 2004/0117839 A1 | 6/2004 | Watson et al. |
| 2004/0128319 A1 | 7/2004 | Davis et al. |
| 2004/0139482 A1 | 7/2004 | Hale |
| 2004/0148638 A1 | 7/2004 | Weisman et al. |
| 2004/0152517 A1 | 8/2004 | Hardisty |
| 2004/0152519 A1 | 8/2004 | Wang |
| 2004/0158855 A1 | 8/2004 | Gu et al. |
| 2004/0162124 A1 | 8/2004 | Barton et al. |

(56) References Cited

U.S. PATENT DOCUMENTS

| | | |
|---|---|---|
| 2004/0166873 A1 | 8/2004 | Simic |
| 2004/0176162 A1 | 9/2004 | Rothschild |
| 2004/0178923 A1 | 9/2004 | Kuang |
| 2004/0183824 A1 | 9/2004 | Benson |
| 2004/0185881 A1 | 9/2004 | Lee |
| 2004/0190779 A1 | 9/2004 | Sarachik et al. |
| 2004/0198495 A1 | 10/2004 | Cisneros et al. |
| 2004/0201626 A1 | 10/2004 | Lavoie |
| 2004/0203667 A1 | 10/2004 | Shroder |
| 2004/0203898 A1 | 10/2004 | Bodin et al. |
| 2004/0210507 A1 | 10/2004 | Asher et al. |
| 2004/0215756 A1 | 10/2004 | VanAntwerp |
| 2004/0216161 A1 | 10/2004 | Barone, Jr. et al. |
| 2004/0216171 A1 | 10/2004 | Barone, Jr. et al. |
| 2004/0224750 A1 | 11/2004 | Al-Ziyoud |
| 2004/0242321 A1 | 12/2004 | Overton |
| 2004/0266513 A1 | 12/2004 | Odom |
| 2005/0005303 A1 | 1/2005 | Barone, Jr. et al. |
| 2005/0021942 A1 | 1/2005 | Diehl et al. |
| 2005/0026699 A1 | 2/2005 | Kinzer et al. |
| 2005/0028208 A1 | 2/2005 | Ellis |
| 2005/0043094 A1 | 2/2005 | Nguyen et al. |
| 2005/0076371 A1 | 4/2005 | Nakamura |
| 2005/0060219 A1 | 5/2005 | Ditering et al. |
| 2005/0097599 A1 | 5/2005 | Potnick et al. |
| 2005/0101309 A1 | 5/2005 | Croome |
| 2005/0113164 A1 | 5/2005 | Buecheler et al. |
| 2005/0003878 A1 | 6/2005 | Updike |
| 2005/0131984 A1 | 6/2005 | Hofmann et al. |
| 2005/0138668 A1 | 6/2005 | Gray et al. |
| 2005/0144102 A1 | 6/2005 | Johnson |
| 2005/0155083 A1 | 7/2005 | Oh |
| 2005/0177861 A1 | 8/2005 | Ma et al. |
| 2005/0210526 A1 | 9/2005 | Levy et al. |
| 2005/0216838 A1 | 9/2005 | Graham |
| 2005/0235043 A1 | 10/2005 | Teodosiu et al. |
| 2005/0239551 A1 | 10/2005 | Griswold |
| 2005/0255901 A1 | 11/2005 | Kreutzer |
| 2005/0256895 A1 | 11/2005 | Dussault |
| 2005/0266869 A1 | 12/2005 | Jung |
| 2005/0273804 A1 | 12/2005 | Preisman |
| 2005/0283800 A1 | 12/2005 | Ellis et al. |
| 2005/0288080 A1 | 12/2005 | Lockton et al. |
| 2005/0288101 A1 | 12/2005 | Lockton et al. |
| 2005/0288812 A1 | 12/2005 | Cheng |
| 2006/0025070 A1 | 2/2006 | Kim et al. |
| 2006/0046810 A1 | 3/2006 | Tabata |
| 2006/0047772 A1 | 3/2006 | Crutcher |
| 2006/0053390 A1 | 3/2006 | Gariepy-Viles |
| 2006/0058103 A1 | 3/2006 | Danieli |
| 2006/0059161 A1 | 3/2006 | Millett et al. |
| 2006/0063590 A1 | 3/2006 | Abassi et al. |
| 2006/0082068 A1 | 4/2006 | Patchen |
| 2006/0087585 A1 | 4/2006 | Seo |
| 2006/0089199 A1 | 4/2006 | Jordan et al. |
| 2006/0111168 A1 | 5/2006 | Nguyen |
| 2006/0135253 A1 | 6/2006 | George et al. |
| 2006/0148569 A1 | 7/2006 | Beck |
| 2006/0156371 A1 | 7/2006 | Maetz et al. |
| 2006/0174307 A1 | 8/2006 | Hwang et al. |
| 2006/0183547 A1 | 8/2006 | Mc Monigle |
| 2006/0183548 A1 | 8/2006 | Morris et al. |
| 2006/0205483 A1 | 9/2006 | Meyer et al. |
| 2006/0205510 A1 | 9/2006 | Lauper |
| 2006/0217198 A1* | 9/2006 | Johnson ............ A63F 13/65 463/40 |
| 2006/0236352 A1 | 10/2006 | Scott, III |
| 2006/0248553 A1 | 11/2006 | Mikkelson et al. |
| 2006/0256865 A1 | 11/2006 | Westerman |
| 2006/0256868 A1 | 11/2006 | Westerman |
| 2006/0269120 A1 | 11/2006 | Nehmadi et al. |
| 2006/0285586 A1 | 12/2006 | Westerman |
| 2007/0004516 A1 | 1/2007 | Jordan et al. |
| 2007/0013547 A1 | 1/2007 | Boaz |
| 2007/0019826 A1 | 1/2007 | Horbach et al. |
| 2007/0028272 A1 | 2/2007 | Lockton |
| 2007/0037623 A1 | 2/2007 | Romik |
| 2007/0054695 A1 | 3/2007 | Huske et al. |
| 2007/0078009 A1 | 4/2007 | Lockton et al. |
| 2007/0083920 A1 | 4/2007 | Mizoguchi et al. |
| 2007/0086465 A1 | 4/2007 | Paila et al. |
| 2007/0093296 A1 | 4/2007 | Asher |
| 2007/0106721 A1 | 5/2007 | Schloter |
| 2007/0107010 A1 | 5/2007 | Jolna et al. |
| 2007/0129144 A1 | 6/2007 | Katz |
| 2007/0147870 A1 | 7/2007 | Nagashima et al. |
| 2007/0162328 A1 | 7/2007 | Reich |
| 2007/0183744 A1 | 8/2007 | Koizumi |
| 2007/0210908 A1 | 9/2007 | Putterman et al. |
| 2007/0219856 A1 | 9/2007 | Ahmad-Taylor |
| 2007/0222652 A1 | 9/2007 | Cattone et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2007/0265089 A1 | 11/2007 | Robarts |
| 2008/0013927 A1 | 1/2008 | Kelly et al. |
| 2008/0051201 A1 | 2/2008 | Lore |
| 2008/0066129 A1 | 3/2008 | Katcher et al. |
| 2008/0076497 A1 | 3/2008 | Kiskis et al. |
| 2008/0104630 A1 | 5/2008 | Bruce |
| 2008/0146337 A1 | 6/2008 | Halonen |
| 2008/0169605 A1 | 7/2008 | Shuster et al. |
| 2008/0240681 A1 | 10/2008 | Fukushima |
| 2008/0248865 A1 | 10/2008 | Tedesco |
| 2008/0270288 A1 | 10/2008 | Butterly et al. |
| 2008/0288600 A1 | 11/2008 | Clark |
| 2009/0011781 A1 | 1/2009 | Merrill et al. |
| 2009/0094632 A1 | 4/2009 | Newman et al. |
| 2009/0103892 A1 | 4/2009 | Hirayama |
| 2009/0186676 A1 | 7/2009 | Amaitis et al. |
| 2009/0163271 A1 | 9/2009 | George et al. |
| 2009/0228351 A1 | 9/2009 | Rijsenbrij |
| 2009/0234674 A1 | 9/2009 | Wurster |
| 2009/0264188 A1 | 10/2009 | Soukup |
| 2010/0099421 A1 | 4/2010 | Patel et al. |
| 2010/0099471 A1 | 4/2010 | Feeney et al. |
| 2010/0107194 A1 | 4/2010 | McKissick et al. |
| 2010/0120503 A1 | 5/2010 | Hoffman et al. |
| 2010/0137057 A1 | 6/2010 | Fleming |
| 2010/0203936 A1 | 8/2010 | Levy |
| 2010/0279764 A1 | 11/2010 | Allen et al. |
| 2011/0053681 A1 | 3/2011 | Goldman |
| 2011/0065490 A1 | 3/2011 | Lutnick |
| 2011/0081958 A1 | 4/2011 | Herman |
| 2011/0130197 A1 | 6/2011 | Bythar et al. |
| 2011/0227287 A1 | 9/2011 | Reabe |
| 2011/0269548 A1 | 11/2011 | Barclay et al. |
| 2011/0306428 A1 | 12/2011 | Lockton et al. |
| 2012/0058808 A1 | 3/2012 | Lockton |
| 2012/0115585 A1 | 5/2012 | Goldman |
| 2012/0157178 A1 | 6/2012 | Lockton |
| 2012/0264496 A1 | 10/2012 | Behrman et al. |
| 2012/0282995 A1 | 11/2012 | Allen et al. |
| 2012/0295686 A1 | 11/2012 | Lockton |
| 2013/0005453 A1 | 1/2013 | Nguyen et al. |
| 2013/0072271 A1 | 3/2013 | Lockton et al. |
| 2013/0079081 A1 | 3/2013 | Lockton et al. |
| 2013/0079092 A1 | 3/2013 | Lockton et al. |
| 2013/0079093 A1 | 3/2013 | Lockton et al. |
| 2013/0079135 A1 | 3/2013 | Lockton et al. |
| 2013/0079150 A1 | 3/2013 | Lockton et al. |
| 2013/0079151 A1 | 3/2013 | Lockton et al. |
| 2013/0196774 A1 | 8/2013 | Lockton et al. |
| 2013/0225285 A1 | 8/2013 | Lockton |
| 2013/0225299 A1 | 8/2013 | Lockton |
| 2014/0031134 A1 | 1/2014 | Lockton et al. |
| 2014/0100011 A1 | 4/2014 | Gingher |
| 2014/0106832 A1 | 4/2014 | Lockton et al. |
| 2014/0128139 A1 | 5/2014 | Shuster et al. |
| 2014/0155130 A1 | 6/2014 | Lockton et al. |
| 2014/0155134 A1 | 6/2014 | Lockton |

(56) References Cited

U.S. PATENT DOCUMENTS

| | | |
|---|---|---|
| 2014/0206446 A1 | 7/2014 | Lockton et al. |
| 2014/0237025 A1 | 8/2014 | Huske et al. |
| 2014/0248952 A1 | 9/2014 | Cibula et al. |
| 2014/0256432 A1 | 9/2014 | Lockton et al. |
| 2014/0279439 A1 | 9/2014 | Brown |
| 2014/0287832 A1 | 9/2014 | Lockton et al. |
| 2014/0335961 A1 | 11/2014 | Lockton et al. |
| 2014/0335962 A1 | 11/2014 | Lockton et al. |
| 2014/0378212 A1 | 12/2014 | Sims |
| 2015/0011310 A1 | 1/2015 | Lockton et al. |
| 2015/0067732 A1 | 3/2015 | Howe et al. |
| 2015/0148130 A1 | 5/2015 | Cibula et al. |
| 2015/0238839 A1 | 8/2015 | Lockton |
| 2015/0238873 A1 | 8/2015 | Arnone et al. |
| 2015/0258452 A1 | 9/2015 | Lockton et al. |
| 2016/0023116 A1 | 1/2016 | Wire |
| 2016/0045824 A1 | 2/2016 | Lockton et al. |
| 2016/0049049 A1 | 2/2016 | Lockton |
| 2016/0054872 A1 | 2/2016 | Cibula et al. |
| 2016/0082357 A1 | 3/2016 | Lockton |
| 2016/0121208 A1 | 5/2016 | Lockton et al. |
| 2016/0134947 A1 | 5/2016 | Huske et al. |
| 2016/0217653 A1 | 7/2016 | Beyer |
| 2016/0271501 A1 | 9/2016 | Balsbaugh |
| 2016/0361647 A1 | 12/2016 | Lockton et al. |
| 2016/0375362 A1 | 12/2016 | Lockton et al. |
| 2017/0036110 A1 | 2/2017 | Lockton et al. |
| 2017/0036117 A1 | 2/2017 | Lockton et al. |
| 2017/0043259 A1 | 2/2017 | Lockton et al. |
| 2017/0053498 A1 | 2/2017 | Lockton |
| 2017/0065891 A1 | 3/2017 | Lockton et al. |
| 2017/0098348 A1 | 4/2017 | Odom |
| 2017/0103615 A1 | 4/2017 | Theodospoulos |
| 2017/0128840 A1 | 5/2017 | Croci |
| 2017/0221314 A1 | 8/2017 | Lockton |
| 2017/0225071 A1 | 8/2017 | Lockton et al. |
| 2017/0225072 A1 | 8/2017 | Lockton et al. |
| 2017/0232340 A1 | 8/2017 | Lockton |
| 2017/0243438 A1 | 8/2017 | Merati |
| 2017/0249801 A1 | 8/2017 | Malek |
| 2017/0252649 A1 | 9/2017 | Lockton et al. |
| 2017/0259173 A1 | 9/2017 | Lockton et al. |
| 2017/0264961 A1 | 9/2017 | Lockton |
| 2017/0282067 A1 | 10/2017 | Lockton et al. |
| 2017/0296916 A1 | 10/2017 | Lockton et al. |
| 2017/0304726 A1 | 10/2017 | Lockton et al. |
| 2017/0345260 A1 | 11/2017 | Strause |
| 2018/0025586 A1 | 1/2018 | Lockton |
| 2018/0071637 A1 | 3/2018 | Baazov |
| 2018/0104582 A1 | 4/2018 | Lockton et al. |
| 2018/0104596 A1 | 4/2018 | Lockton et al. |
| 2018/0117464 A1 | 5/2018 | Lockton et al. |
| 2018/0140955 A1 | 5/2018 | Lockton et al. |
| 2018/0154255 A1 | 6/2018 | Lockton |
| 2018/0169523 A1 | 6/2018 | Lockton et al. |
| 2018/0190077 A1 | 7/2018 | Hall |
| 2018/0236359 A1 | 8/2018 | Lockton et al. |
| 2018/0243652 A1 | 8/2018 | Lockton et al. |
| 2018/0264360 A1 | 9/2018 | Lockton et al. |
| 2018/0300988 A1 | 10/2018 | Lockton |
| 2018/0318710 A1 | 11/2018 | Lockton et al. |
| 2019/0054375 A1 | 2/2019 | Lockton et al. |
| 2019/0060750 A1 | 2/2019 | Lockton et al. |

FOREIGN PATENT DOCUMENTS

| | | |
|---|---|---|
| CA | 2279069 | 7/1999 |
| CA | 2287617 | 10/1999 |
| EP | 0649102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1989 |
| WO | 01/039506 A2 | 5/2001 |
| WO | 01/65743 A1 | 9/2001 |
| WO | 02/03698 A1 | 10/2002 |
| WO | 2005064506 A1 | 7/2005 |
| WO | 2006004855 | 1/2006 |
| WO | 2006004856 | 1/2006 |
| WO | 2007002284 | 1/2007 |
| WO | 2007016575 | 2/2007 |
| WO | 2007041667 | 4/2007 |
| WO | 2008027811 A2 | 3/2008 |
| WO | 2008115858 A1 | 9/2008 |

OTHER PUBLICATIONS

'Ark 4.0 Standard Edition, Technical Overview 'www.twowaytv.com/version4/technologies/tech_ark_professionals.asp.

"Understanding the Interactivity Between Television and Mobile commerce", Robert Davis and David Yung, Communications of the ACM, Jul. 2005, vol. 48, No. 7, pp. 103-105.

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modeling User Behavior in Networked Games byTristan Henderson and Saleem Bhatti", www.woodworm.cs.uml.edu/rprice/ep/henderson.

"SMS Based Voting and Survey System for Meetings", www.abbit.be/technology/SMSSURVEY.html.

"PurpleAce Launches 3GSM Ringtone Competition", www.wirelessdevnet.com/news/2005/jan/31/news6html.

"On the Perfomance of Protocols for collecting Responses over a Multiple-Access Channel", Mostafa H. Ammar and George N. Rouskas, IEEE INCOMFORM '91, pp. 1490-1499, vol. 3, IEEE, New York, NY.

Merriam-Webster, "Game" definition, <http://www.merriam-webster.com/dictionary/agme.pg.1.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

http://help.yahoo.com/help/us/tourn/tourn-03.html.

Pinnacle, "The basics of reverse line movement," Jan. 19, 2018, Retrieved on Jan. 22, 2020 , http://www.pinnacle.com/en/betting-articles educational/basics-of-reverse-line-movement/QAH26XGGQQS7M3GD.

Gambling Commission,"Virtual currencies, eSports and social casino gaming-position paper," Mar. 2017, Retrieved on Jan. 22, 2020, http://gamblingcomission.gov.uk/PDF/Virtual-currencies-eSports-and-social-casino-gaming.pdf.

Sipko et al.,"Machine learning for the prediction of professional tennis matches," In: MEng computing-final year project, Imperial College London, Jun. 15, 2015, http://www.doc.ic.ac.uk/teaching/distinguished-projects/2015/m.sipko.pdf.

Winview Game Producer, "Live TV Sports Play Along App WinView Games Announces Sponsorship With PepsiCo to Start This Holiday Season," In Winview Games. Dec. 21, 2016, Retrieved on Jan. 21, 2020 from , http://www.winviewgames./press-release/live-tv-sports-play-along-app-winview-games-announces-sponsorship-pepsico-start-holiday-season/.

The International Search Report and the Written Opinion for the PCT/US2019/054859 dated Feb. 4, 2020.

\* cited by examiner

Legend
804

> Next Play: Run/Pass
> Direction: Left/Middle/Right
>
> If Run, Who: QB/HB/FB/WR
> If Run, Type: Sneak/Draw/Sweep/Bootleg
>
> If Pass, Which Receiver: WR1/WR2/TE/RB
> If Pass, Type: Screen/Deep Out/Slant/Post
>
> Extra: TD/Fumble/Int/Sack/First Down Champion
802

> Next Play: Run/Pass
> Direction: Left/Middle/Right
>
> If Run, Who: QB/HB/FB/WR
> If Pass, Which Receiver: WR1/WR2/TE/RB Challenger
800

> Next Play: Run/Pass
> Direction: Left/Middle/Right

Fig. 8

TIERS
900 — CHALLENGER 
902 — QUALIFIER 
904 — CHAMPION 
906 — MASTER 
908 — LEGEND 
Fig. 9

1000

Legend
- Football God    2000
- King of Kicks    1950
- TD Todd    1900
  - ⋮

Master
- Bob 2000    1750
- Eagles Rule    1725
- Cartman    1700
  - ⋮

Champion
- Tiny Tim    1600
- Earl    1500
- Go Broncos    1400
  - ⋮

Qualifier
- ILVTX    1300
- 12345    1250
- JOE111    1100
  - ⋮

Challenger
- Newbie1    500
- Bartman    400
- Rockin Tacos    200
  - ⋮

Show Scores by:
- Ascending
- Descending
- Alphabetical A-Z
- Alphabetical Z-A

Fig. 10

AirPlay Football

Player Rankings 1204 — Welcome Jim 65
*You have achieved the rank of Qualifier*

Show Scores By: Ascending ▲  Descending ▼  A-Z  Z-A

Tabs: Legends | Masters | Champions | Qualifiers | Challengers | All

| Class | Score |
|---|---|
| Qualifiers | 1, 2, 3, 4 Next>> |
| Football God | 1300 |
| King of Kicks | 1295 |
| TD Todd | 1289 |
| Joe Cool | 1288 |
| Bob 2000 | 1271 |
| Eagles Rule | 1265 |
| Jim65 | 1248 |
| Niiners | 1247 |
| Tiny Tim | 1241 |
| Earl | 1229 |
| Go Broncos | 1225 |
| New Yorker | 1210 |
| ILVTX | 1190 |
| Fred Savage | 1179 |
| Joe1111 | 1168 |
| Geoff | 1165 |
| Newbie 1 | 1145 |
| Bartman | 1130 |
| TD Todd | 1129 |
| Ed Frankel | 1123 |

1208 — 1, 2, 3, 4 Next>>

Navigation: Home | About Airplay | Our Games | Learn More | Tournament Prizes

Logout

Fig. 12

GAME OF SKILL PLAYED BY REMOTE PARTICIPANTS UTILIZING WIRELESS DEVICES IN CONNECTION WITH A COMMON GAME EVENT

RELATED APPLICATION(S)

This Patent Application is a continuation application of the co-pending U.S. patent application Ser. No. 11/298,901, filed Dec. 9, 2005 and entitled "A GAME OF SKILL PLAYED BY REMOTE PARTICIPANTS UTILIZING WIRELESS DEVICES IN CONNECTION WITH A COMMON GAME EVENT," which claims priority under 35 U.S.C. § 119(e) of the co-owned U.S. Provisional Patent Application, Ser. No. 60/635,221, filed Dec. 10, 2004, and entitled "A GAME OF SKILL PLAYED BY REMOTE PARTICIPANTS UTILIZING WIRELESS DEVICES SUCH AS CELL PHONES IN CONNECTION WITH A COMMON GAME EVENT WHERE PARTICIPANTS ARE GROUPED BY RELATIVE SKILL." The U.S. patent application Ser. No. 11/298,901, filed Dec. 9, 2005 and entitled "A GAME OF SKILL PLAYED BY REMOTE PARTICIPANTS UTILIZING WIRELESS DEVICES IN CONNECTION WITH A COMMON GAME EVENT," and the Provisional Patent Application, Ser. No. 60/635,221, filed Dec. 10, 2004, and entitled "A GAME OF SKILL PLAYED BY REMOTE PARTICIPANTS UTILIZING WIRELESS DEVICES SUCH AS CELL PHONES IN CONNECTION WITH A COMMON GAME EVENT WHERE PARTICIPANTS ARE GROUPED BY RELATIVE SKILL" are all also hereby incorporated by reference in its entirety.

The patent application Ser. No. 11/298,901, filed Dec. 9, 2005 and entitled "A GAME OF SKILL PLAYED BY REMOTE PARTICIPANTS UTILIZING WIRELESS DEVICES IN CONNECTION WITH A COMMON GAME EVENT," is a continuation-in-part of U.S. patent application Ser. No. 11/166,596, filed on Jun. 24, 2005 and entitled "METHODS AND APPARATUS FOR DISTRIBUTED GAMING OVER A MOBILE DEVICE" which claims priority under 35 U.S.C. § 119(e) of the U.S. Provisional Patent Application Ser. No. 60/588,273, filed Jul. 14, 2004 and entitled "A METHODOLOGY FOR PROVIDING ALL CONTESTANTS IN GAMES OF SKILL PLAYABLE ON CELL PHONES WITH THEIR CURRENT STANDING WHILE RECEIVING GAME CONTROL INFORMATION ONE-WAY VIA A 'BROADCAST' TRANSMISSION." The U.S. patent application Ser. No. 11/166,596, filed on Jun. 24, 2005 and entitled "METHODS AND APPARATUS FOR DISTRIBUTED GAMING OVER A MOBILE DEVICE" and the U.S. Provisional Patent Application Ser. No. 60/588,273, filed Jul. 14, 2004 and entitled "A METHODOLOGY FOR PROVIDING ALL CONTESTANTS IN GAMES OF SKILL PLAYABLE ON CELL PHONES WITH THEIR CURRENT STANDING WHILE RECEIVING GAME CONTROL INFORMATION ONE-WAY VIA A 'BROADCAST' TRANSMISSION" are hereby incorporated by reference in their entirety.

FIELD OF THE INVENTION

The present invention relates to the field of distributed gaming. More specifically, the present invention relates to the field of distributed gaming utilizing a mobile device.

BACKGROUND OF THE INVENTION

In the United States alone there are over 170 million registered cell phones. With the expiration of the U.S. Pat. No. 4,592,546 to Fascenda et al., companies are able to now use the cell phone and other mobile communication devices utilizing a multicast network to control television viewers in games of skill based upon predicting, for example, what the quarterback may call on the next play. In addition, games of skill with a common start time can be conducted simultaneously among cell phone owners, based on classic card, dice, trivia, and other games. In order to avoid the anti-gaming laws in the various states, elements of chance must be virtually non-existent in such games and the winners therefore determined by the relative skill, experience and practice of the player in each discrete game.

U.S. Pat. No. 5,813,913 to Berner and Lockton provides for a central computing system which includes a means of grouping participants having similar skill levels together in simultaneous, but separate, levels of competition playing an identical game. The relative performances are communicated to only those participants competing at the same skill level. The Berner/Lockton patent also provides for a wireless receiving device to permanently store the specific skill level for each participant for each type of common event such as those based on televised sports or game shows. The Berner/Lockton patent provides for a telephonic link at the completion of the game to collect information and update the skill level of the participants of a particular game. When a person achieves sufficient points or meets other objective criteria to graduate into another skill level, a method is provided for accomplishing this in the central computer and then transmitting an alert to the participant notifying them of their promotion. The Berner/Lockton patent describes awarding prizes and providing recognition for the members of each discreet skill level in a common game. All users, no matter what level they are on, receive the same number of questions and thus the possibility of earning the same number of points. Thus direct comparisons between users at different levels, although not encouraged are possible. Such comparisons often times lead to user discouragement.

The subsequent development of the internet now allows subscribers of such a service to view virtually all relevant information concerning the results, standings, and promotions of all competitors at all skill levels. Because the Berner/Lockton patent provides an identical game with the same number of questions for all members of the skill level to play, the system described in the Berner/Lockton patent can result in discouragement of competitors at a lower skill level when the scores achieved by players playing at a higher skill level are viewed, either by visiting the internet site to view results, or directly from a friend playing at a higher skill level. The present application addresses a different competitive system which directly solves these issues, while improving the entertainment experience for the participants.

SUMMARY OF THE INVENTION

A game of skill played simultaneously by several players whereby each participant effectively competes only against players having a similar skill tier in order to provide a strong motivation. The system includes a central computer system with each remote participant having a mobile device such as a cell phone. The system also provides for effective promotion or updating to a higher skill tier of successful players of the game. Each skill tier adds complexity as well as increased point potentials, such as the addition of point doubling options. The game is relatively simple initially, permitting new users to understand, play and enjoy the game. As the user becomes more skilled and reaches higher tiers, the game becomes more challenging thus retaining a player's interest. Players are able to view all scores including those in other tiers, although they will know that players in other tiers had more opportunities to earn points. In one embodiment, a system for a game of skill played by one or more individuals viewing one or more common game events comprises a mobile device for receiving one or more game play inputs by the one or more individuals and scoring in response to the one or more game play inputs and a central computing system for defining a predetermined plurality of game skill tiers including an initial entry level skill tier and one or more advanced skill tiers for receiving one or more game scores and determining one of the plurality of the predetermined plurality of game skill tiers of the one or more individuals for a particular game and promoting to a relatively higher skill tier more successful players of each game, wherein each tier has an increasingly more sophisticated level of play. The mobile device is from a group consisting of a cellular phone, a PDA, an MP3 player, and a laptop computer. The mobile device includes means for permanently storing the game skill tier selected from the plurality of game skill tiers defined on the central computing system. The one or more common game events is a live television broadcast of a sporting event. The one or more common game events is a live television broadcast of a live game from a group consisting of football, baseball, hockey, basketball, boxing, golf, soccer and auto racing. The one or more common game events is from a group consisting of a televised game show, a reality show and an entertainment show. The one or more common game events is a non-televised game from a group consisting of cards, dice, word games, puzzles and trivia games. The one or more common game events is played on computers, the Internet, handhelds or cell phones. The game scores are communicated to the one or more individuals on a webpage. The game scores are communicated to the one or more individuals on the mobile device. The tiers are communicated to the one or more individuals. The central computing system communicates all game scores to individuals irregardless of game skill tier. Alternatively, The central computing system communicates all game scores in the game skill tier to individuals included in the individuals' game skill tier. The relatively higher skill tiers have more questions and more opportunities for points than respectively lower skill tiers. The system functions utilizing the Internet.

In another embodiment, a system for a game of skill played by one or more individuals viewing one or more common game events comprises a mobile device for receiving one or more game play inputs by the one or more individuals and scoring in response to the one or more game play inputs and a central computing system for defining a predetermined plurality of game skill tiers including an initial lowest skill tier and one or more advanced skill tiers for receiving one or more game scores and determining one of the plurality of the predetermined plurality of game skill tiers of the one or more individuals for a particular game and promoting to a relatively higher skill tier more successful players of each game, wherein each tier has a different level of play, further wherein the central computing system communicates all game scores to individuals irregardless of game skill tier. The mobile device is from a group consisting of a cellular phone, a PDA, an MP3 player, and a laptop computer. The mobile device includes means for permanently storing the game skill tier selected from the plurality of game skill tiers defined on the central computing system. The one or more common game events is a live television broadcast of a sporting event. The one or more common game events is a live television broadcast of a live game from a group consisting of football, baseball, hockey, basketball, boxing, golf, soccer and auto racing. The one or more common game events is from a group consisting of a televised game show, a reality show and an entertainment show. The one or more common game events is a non-televised game from a group consisting of cards, dice, word games, puzzles and trivia games. The one or more common game events is played on computers, the Internet, handhelds or cell phones. The game scores are communicated to the one or more individuals on a webpage. The game scores are communicated to the one or more individuals on the mobile device. The tiers are communicated to the one or more individuals. The relatively higher skill tiers have more questions and more opportunities for points than respectively lower skill tiers. The system functions utilizing the Internet.

In yet another embodiment, an apparatus for a game of skill played simultaneously by groups of participants, each group comprising several participants of a particular game skill tier, remote from each other in conjunction with at least one common game event where each participant player of a game receives one or more scores comprises means for providing the common game event and transmitting such event to each of the remote participants, control unit means associated with each remote participant for receiving game play inputs by each participant and scoring in response to the inputs, central computer system means for defining a predetermined plurality of game skill tiers including an initial entry skill tier and one or more advanced skill tiers and for receiving the game scores and determining one of the predetermined plurality of game skill tiers of each of the participants for a particular game and also promoting to a relatively higher skill tier more successful players of each game, wherein each tier has a different level of play, the central computer system also including means for communicating game scores to all participants and means for permanently storing the game skill tier of each participant for each type of common game event. The control unit means is from a group consisting of a cellular phone, a PDA, an MP3 player, and a laptop computer. The control unit means includes means for permanently storing the game skill tier selected from the plurality of game skill tiers defined on the central computing system. The one or more common game events is a live television broadcast of a sporting event. The one or more common game events is a live television broadcast of a live game from a group consisting of football, baseball, hockey, boxing, basketball, golf, soccer and auto racing. The one or more common game events is from a group consisting of a televised game show, a reality show and an entertainment show. The one or more common game events is a non-televised game from a group consisting of cards, dice, word games, puzzles and trivia games. The one or more common game events is played on computers, the Internet, handhelds or cell phones. The game scores are communicated to the groups of participants on a webpage. The game scores are communicated to the groups of participants on the mobile device. The tiers are communicated to the one or more individuals. More questions are asked and more points are awarded at the relatively higher skill tier. The apparatus functions utilizing the Internet.

In another embodiment, a method of controlling a game of skill comprises transmitting one or more common game events to one or more mobile devices, defining a predetermined plurality of game skill tiers, querying one or more users via the one or more mobile devices, wherein the querying is relative to the predetermined plurality of game skill tiers such that each tier has a different level of querying, promoting one or more individuals to a relatively higher tier of the predetermined plurality of game skill tiers based on correctness of responses to the querying, determining a score for the one or more individuals based on the correctness of responses to the querying and communicating the scores of the one or more users to the one or more users. The one or more mobile devices is from a group consisting of a cellular phone, a PDA, an MP3 player, and a laptop computer. The mobile device includes means for permanently storing the game skill tier selected from the plurality of game skill tiers defined on the central computing system. The one or more common game events is a live television broadcast of a sporting event. The one or more common game events is a live television broadcast of a live game from a group consisting of football, baseball, hockey, basketball, boxing, golf, soccer and auto racing. The one or more common game events is from a group consisting of a televised game show, a reality show and an entertainment show. The one or more common game events is a non-televised game from a group consisting of cards, dice, word games, puzzles and trivia games. The one or more common game events is played on computers, the Internet, handhelds or cell phones. Communicating the scores is by posting the scores on a webpage. Communicating the scores is by sending the scores to the one or more mobile devices. The method further comprises, communicating the tiers to the one or more users. More questions are asked and more points are awarded at the relatively higher skill tier. The method utilizes the Internet.

In yet another embodiment, a network for controlling a game of skill played by one or more individuals viewing one or more common game events comprises a plurality of devices for receiving one or more game play inputs by the one or more individuals and scoring in response to the one or more game play inputs and a central computing system for defining a predetermined plurality of game skill tiers including an initial lowest skill tier and one or more advanced skill tiers for receiving one or more game scores and determining one of the plurality of the predetermined plurality of game skill tiers of the one or more individuals for a particular game and promoting to a relatively higher skill tier more successful players of each game, wherein each tier has a different level of play. The plurality of devices are from a group consisting of cellular phones, PDAs, an MP3 players, and laptop computers. The plurality of devices include means for permanently storing the game skill tier selected from the plurality of game skill tiers defined on the central computing system. The one or more common game events is a live television broadcast of a sporting event. The one or more common game events is a live television broadcast of a live game from a group consisting of football, baseball, hockey, basketball, boxing, golf, soccer and auto racing. The one or more common game events is from a group consisting of a televised game show, a reality show and an entertainment show. The one or more common game events is a non-televised game from a group consisting of cards, dice, word games, puzzles and trivia games. The one or more common game events is played on computers, the Internet, handhelds or cell phones. The game scores are communicated to the one or more individuals on a webpage. The game scores are communicated to the one or more individuals on the mobile device. The tiers are communicated to the one or more individuals. The central computing system communicates all game scores to individuals irregardless of game skill tier. Alternatively, the central computing system communicates all game scores in the game skill tier to individuals included in the individuals' game skill tier. The relatively higher skill tiers have more questions and more opportunities for points than respectively lower skill tiers. The network of devices function utilizing the Internet.

In yet another embodiment, a graphical user interface for displaying scores of a game of skill played by a plurality of players viewing one or more common game events comprises a representation of a plurality of tiers and a list of a plurality of scores of the plurality of players, wherein each player has an associated tier and further wherein the scores for each player are listed in the associated one of the plurality of tiers. The plurality of players play a game with different opportunities to score points. Alternatively, the plurality of players play a game with the same opportunities to score points. The plurality of scores are displayed in an order selected from a group including ascending, descending and alphabetical.

BRIEF DESCRIPTION OF THE DRAWINGS

FIG. 8 illustrates an example of differences between each tier.

FIG. 9 illustrates a set of example tiers.

FIG. 10 illustrates an exemplary graphical user interface.

FIGS. 1A-C illustrate exemplary graphical user interfaces.

FIG. 12 illustrates an exemplary graphical user interface on a web page.

DETAILED DESCRIPTION OF THE PREFERRED EMBODIMENT

Figure 1:
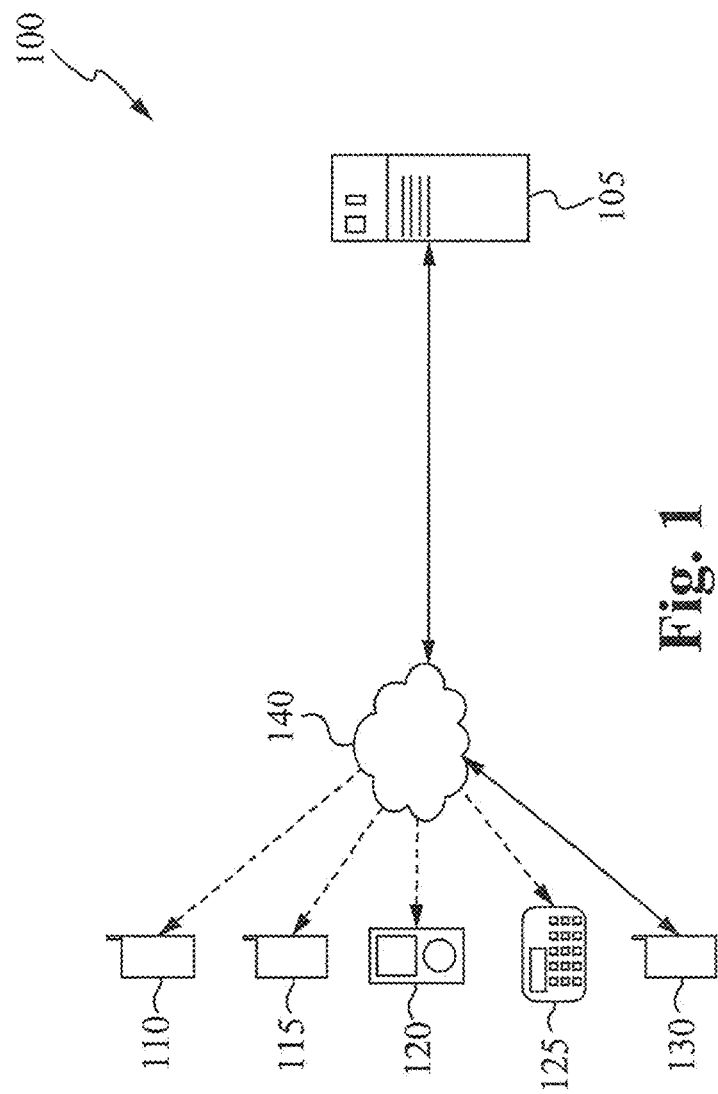
FIG. 1 illustrates a mixed topology for a network game.

With the proliferation of mobile devices, a growing number of mobile device users are able to participate in a distributed online or network game. These games might be associated with various popular live and/or televised events. Participants of the game typically answer the same questions utilizing a mobile device as a live contestant at a game show (e.g., Wheel of Fortune®, Jeopardy®, etc.). Participants are also able to make predictions regarding the outcome of events and even play-by-play decisions for sporting events such as football, baseball, auto racing, or any of a number of other sporting events. The expansion to include participants utilizing mobile devices increases the number of participants in these network games almost limitlessly. For instance, the Super Bowl live audience numbers in the tens of thousands of spectators, while the television audience may number in excess of 100 million viewers. A majority of these viewers have access to an assortment of mobile devices, e.g., most commonly in the form of the ubiquitous cellular telephone.

For high bandwidth connections, games are typically controlled through a full time, two-way connection to a game server that routinely supplies information to the participants of the game. As is known in the art, two-way network connections provide comparatively reliable and secure service. However, forming a two-way connection between the high potential number of participants of a real-time game (e.g., associated with a broadcast event) and a central host server creates challenges because of the low latency demands of such a game played in realtime. Moreover, in the past, two-way networks posed scalability issues and became impractical for massive numbers of participants and for games over low bandwidth connections such as some mobile networks. Ultimately, the implementation of such a two-way system could be expensive because of the vast communication demands of continuously updating potentially millions of contestants of the status of their ongoing, changing, and fast paced predictions. This burden on the game server is significant because many games require acknowledgment by the server of the continuously changing predictions, which must be displayed on the mobile device in less than 500 milliseconds. The same problem also exists in non-television broadcast based games played over mobile devices that require a common start time for all competitors and where there are a large number of potential competitors. However, with the advancements of server speed and greater bandwidth, even for mobile networks, two-way connection is practical even with very large groups of participants. Furthermore, as the technology improves and becomes less expensive, the implementation of a two-way system is able to avoid high expenses. Even though a realtime game requires low latency, a two-way system utilizing proper configurations with powerful servers over ever growing networks is able to handle the needs of the game.

A system and method are provided for updating participants in a game. In some embodiments, the method selects a set of sampling participants from the set of all participants of a game. In some of these embodiments, the selection occurs prior to the start of the game. The method of some embodiments establishes a two-way connection between a server and each of the sampling participants. The method continuously maintains the two-way connection throughout the game. After each discrete game period, the method receives from a sampling participant, data for the sampling participant's game period performance. Based on the received data, the method determines the performance for the game period and broadcasts this information to a participant. Some embodiments base the data on a statistically projectable random sample that is representative of all the participants in the game. In some embodiments, the broadcast recipient is a non-sampling participant. A non-sampling participant is a participant who was not selected for the set of sampling participants. In some embodiments, the non-sampling participant, utilizing the projectable data, determines a standing relative to the other participants for the game period.

Another effective means of controlling a large-scale network game is to use a broadcast server topology to one-way multicast the same information to all participants simultaneously. Thus, some embodiments of the invention provide for a mobile device (e.g., cellular phone, PDA, etc.) as the receiver in a broadcast receiver topology. However, many current mobile devices are capable of operation in both one-way and two-way modes. These modes include small message service (SMS), instant messaging (IM) or Internet Relay Chat (IRC), email, voice and/or other data modes over a number of protocols such as transport control protocol (TCP) or universal datagram protocol (UDP).

Thus, the network game topology of some embodiments may include a mixture of one-way receivers and two-way clients to realize the benefits of both the one-way broadcast and two-way client/server architectures. FIG. 1 illustrates such a mixed topology 100. As shown in FIG. 1, a server 105 simultaneously broadcasts to several receivers 110-125 that are configured for one-way mode reception, while sending and receiving messages with a two-way mode client 130, through a network 140. In some embodiments, the network 140 includes a cellular network. Current mobile device technology allows the use of each mobile device connected to the network 140 to store locally certain game information such as a cumulative score. Particularly for the broadcast receivers 110-125, this relieves some burden on the server in storing and managing this data, and on the network 140 in relaying the data. As mentioned above, one advantage of the one-way architecture is reducing network and/or server latency by the distribution of data for processing and/or storage at the receiver. To implement such a topology, some embodiments employ a setup process that will be described by reference to FIG. 2.

Figure 2:
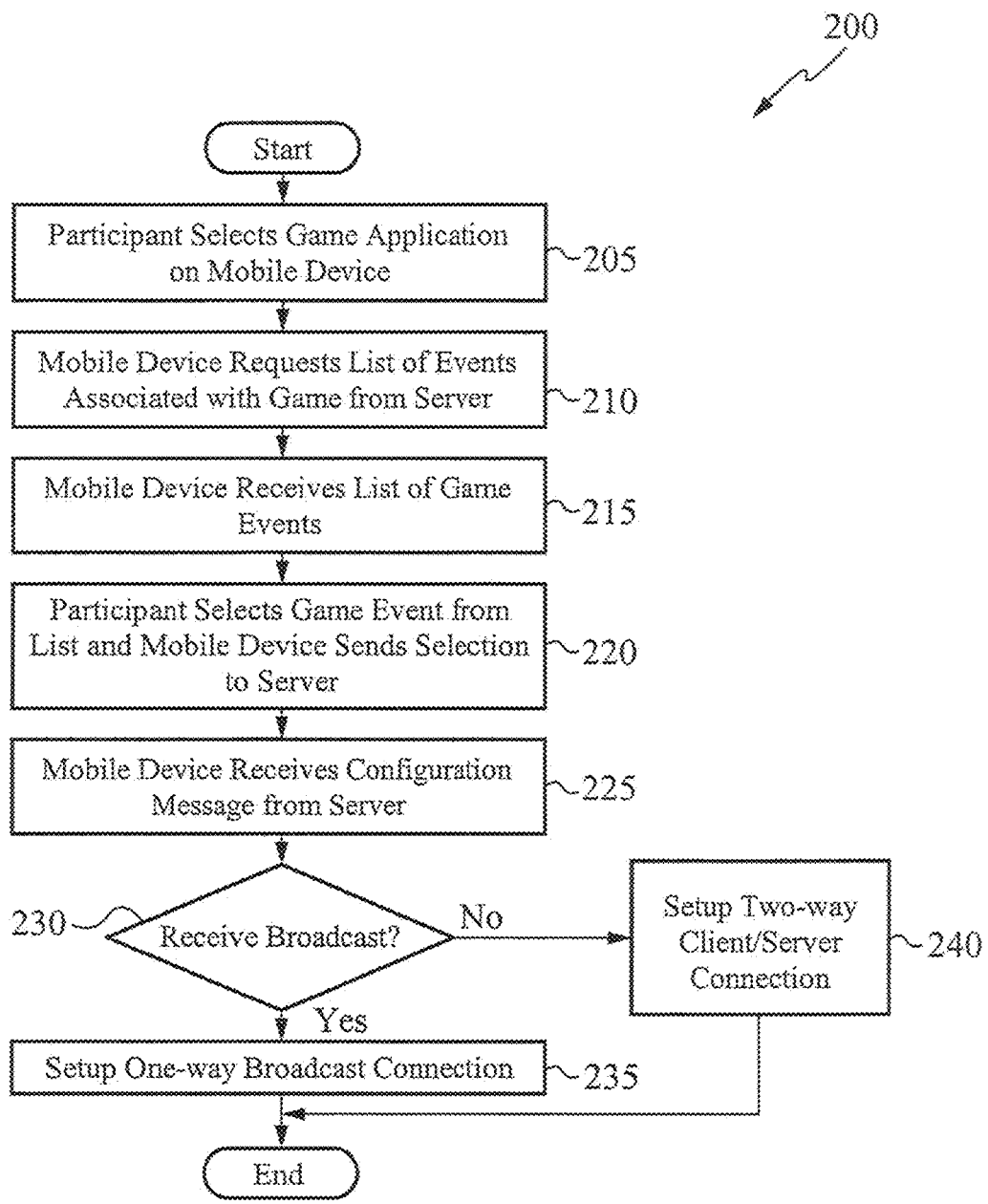
FIG. 2 illustrates a process flow for getting a schedule of events on a mobile device for a network game.

FIG. 2 illustrates a mobile device setup process 200 for getting a schedule of events on a mobile device for a network game. As shown in this figure, the mobile device set up process 200 begins at the step 205, where a game participant selects a game application by using the participant's mobile device. Then the process 200 transitions to the step 210, where the mobile device requests a list of game events associated with the selected game from a server, such as the server 100 represented in FIG. 1. In some embodiments, the server 100 is a single computer, while in other embodiments the server 100 takes the form of any number of computers in any number of configurations, such as a server farm or cluster. Regardless of the configuration, the server typically hosts and officiates the game for these embodiments. The server of some embodiments will be described in further detail by reference to FIGS. 4, 5, and 6.

As shown in FIG. 2, after requesting a list of events at the step 210, the mobile device receives a list of game events and displays the list to the participant at the step 215. At the step 220, the participant selects a game event in which to compete, and sends the selection to the server. Typically, the server configures the game event for the requesting mobile device. The server configuration of some embodiments includes a determination of whether the mobile device should set up a one-way or two-way connection with the server. The configuration process by the server of some embodiments will be described in further detail by reference to FIG. 5.

When the server has configured the game event, the requesting mobile device receives a configuration message from the server at the step 225 and the process transitions to the step 230. At the step 230, the mobile device of some embodiments determines whether the configuration message from the server indicated that the mobile device should set up for one-way broadcast mode. If the message at the step 225 indicates that the mobile device should operate in broadcast mode, the process 200 transitions to the step 235 where the mobile device is configured to receive one-way broadcast transmissions from the server, and then the process 200 concludes. Otherwise, the process 200 transitions to the step 240 where the mobile device sets up a two-way client/server connection with the server for the selected game event, and the mobile device setup process 200 concludes.

Figure 3:
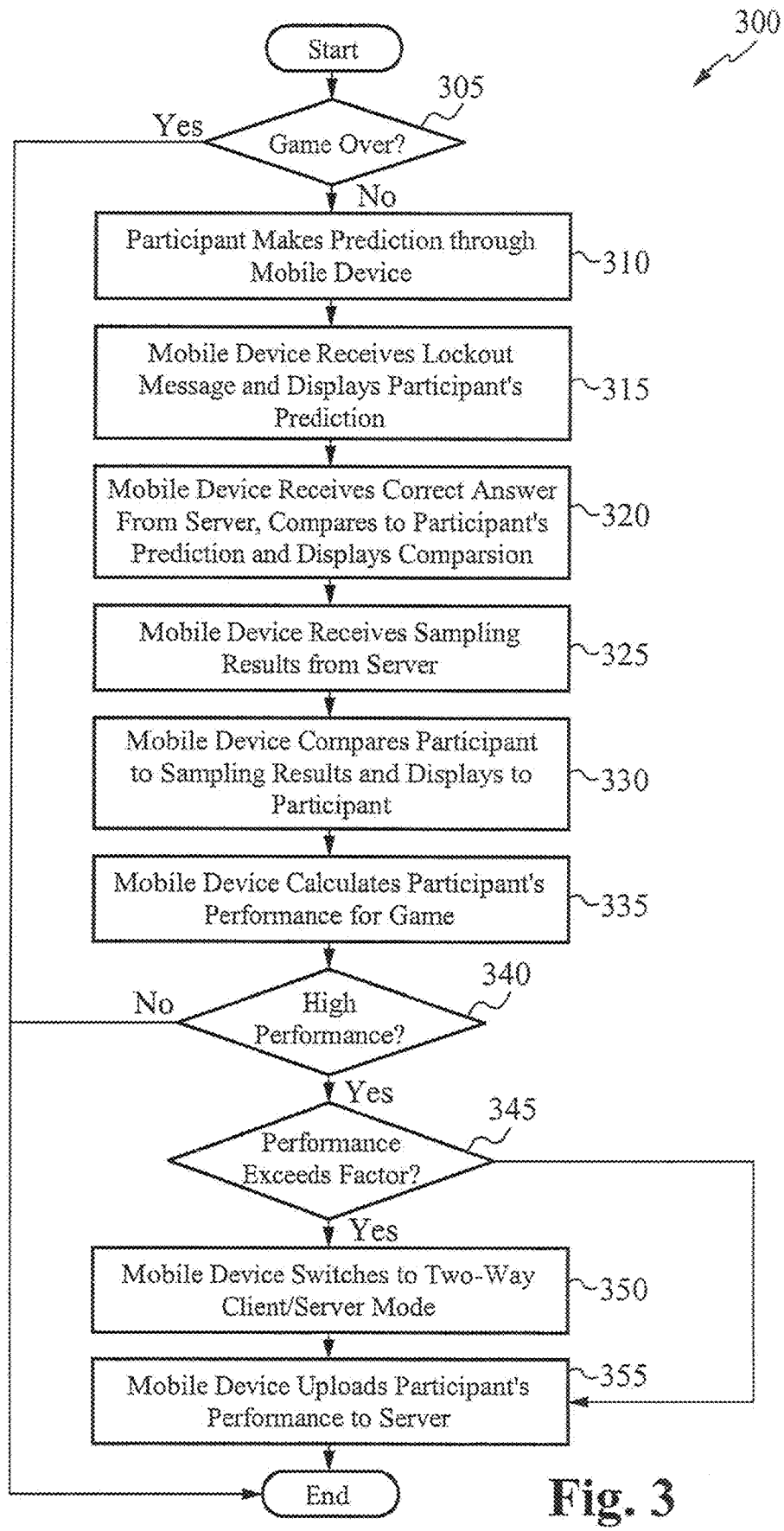
FIG. 3 illustrates a process flow for play in conjunction with a synchronized live event on a mobile device in a network game.

Once the participant has selected the game and the mobile device has prepared the connection with the server. The participant may play the game over the mobile device. FIG. 3 illustrates a mobile device operation process 300 for play in conjunction with a synchronized live event. The mobile device operation process 300 begins at the step 305 where the process 300 determines whether the game is over. If the game is over, then the process 300 concludes. If the game is not over, then the process 300 transitions to the step 310 where the participant makes a prediction regarding some facet of the game being played. The participant makes the prediction by using the mobile device that was set up to play the game in accordance with the set up process 200 described above in relation to FIG. 2.

As shown in FIG. 3, after the participant makes a prediction, the mobile device operation process 300 transitions to the step 315 when the mobile device receives a lockout message from the server. At the step 315, upon receiving the lockout message, the mobile device displays the participant's current prediction, if any, to the participant. In some embodiments, at the conclusion of each game period or scoring event, for example a football play or a baseball pitch, the server sends "lock out" signals prohibiting predictions or answers to the questions via a one-way broadcast transmission before the correct answers or facts are revealed. The participant's mobile device in these embodiments determines whether the participant's predictions or answers were: (1) entered prior to the receipt of the time stamped lock out message and (2) correct or incorrect. In some embodiments, the mobile device computes locally a cumulative score based on whether the participant was correct, as opposed to performing these calculations for each participant on a central server. Such a system has the ability to scale to accommodate a potentially large number of participants from a huge audience. The lockout message and whether a game is over will be described later by reference to FIG. 6.

After the mobile device receives a lockout message at the step 315, the process 300 transitions to the step 320 where the mobile device receives the correct answer from the server, compares the received answer to the participant's prediction, and displays the comparison to the participant. Then, at the step 325, the mobile device receives a set of sampling results from the server. Prior to the commencement of the game, the server of some embodiments selects a statistically significant random sample of participants who have registered their intention to play the game. The server instructs these sampling participants' mobile devices to establish with the server a two-way connection to be maintained for the duration of the contest or game. Some embodiments establish the two-way connection transparently, which occurs with or without the participant's knowledge. The server of some embodiments monitors the period-by-period scores of this statistically significant set of sampling participants. In some embodiments, the sampling results contain a distribution of the performance of the sampling participants for the last period of the game that was tabulated. Some of these embodiments employ a histogram format to represent the sampling results.

After each discrete period in the contest, the server of some embodiments broadcasts some of the information collected from the sampling participants as well as the correct answers or predictions for each game period. In some of these embodiments, the game application software residing in the mobile device will compare the participant's current score to the sampling results. For example, a participant who won the maximum number of points possible on their last prediction might be informed they had moved up from the 72nd percentile to the 89th percentile at that point in the game. Some embodiments further provide a visual display of the current percentile standing for the participant based upon the comparison of the participant's score to the representative sample. For some of these embodiments, the sampling results include a histogram or another graphical representation of the sampling results. Generation and transmission of the sampling results will be further described below by reference to FIG. 6.

When the mobile device receives the sampling results at the step 325, the process 300 transitions to the step 330 where the mobile device compares the participant's performance to the sampling results and displays the comparison to the participant. Then, the process 300 transitions to the step 335 where the mobile device tabulates and stores the participant's performance for the game. This tabulation and storage may include a ranking system. Once the mobile device determines the participant's performance, the process 300 transitions to the step 340 where the process 300 determines whether the participant has achieved a high degree of performance. For some embodiments, a high degree of performance indicates a greater likelihood that the participant will have high enough score(s) to win. In these embodiments, the method uploads the participant's performance to the server for comparison against the uploaded results of the other high performers. Thus, these embodiments monitor only the subset of high scorers, based on the particular game parameters, to determine the winner(s).

If the participant has not achieved notable performance, the process 300 concludes. Otherwise if the participant has performed well, the process 300 of some embodiments transitions to the step 345, where the process 300 determines whether the participant has exceeded one or more performance factors. If the participant has not exceeded the performance factor(s) then the process 300 transitions to the step 355 where the mobile device uploads the participant's performance information to the server, and the process 300 concludes. Otherwise, the participant exceeds the performance factor and the process 300 transitions to the step 350 where the mobile device switches to a two-way client/server mode. Then the mobile device uploads the participant's performance information to the server at the step 355 and the process concludes.

Some embodiments use the performance determination at the step 340 to check whether the participant's performance is high enough to warrant transmission to the server. In these embodiments, high performance may indicate whether the participant is likely to win. Some embodiments use the performance factor of the step 345 in FIG. 3 to determine whether the participant exhibits unusual performance or activity that might constitute cheating. This topic will be further discussed below. The server of some embodiments will now be described in further detail by reference to FIGS. 4, 5, and 6.

Figure 4:
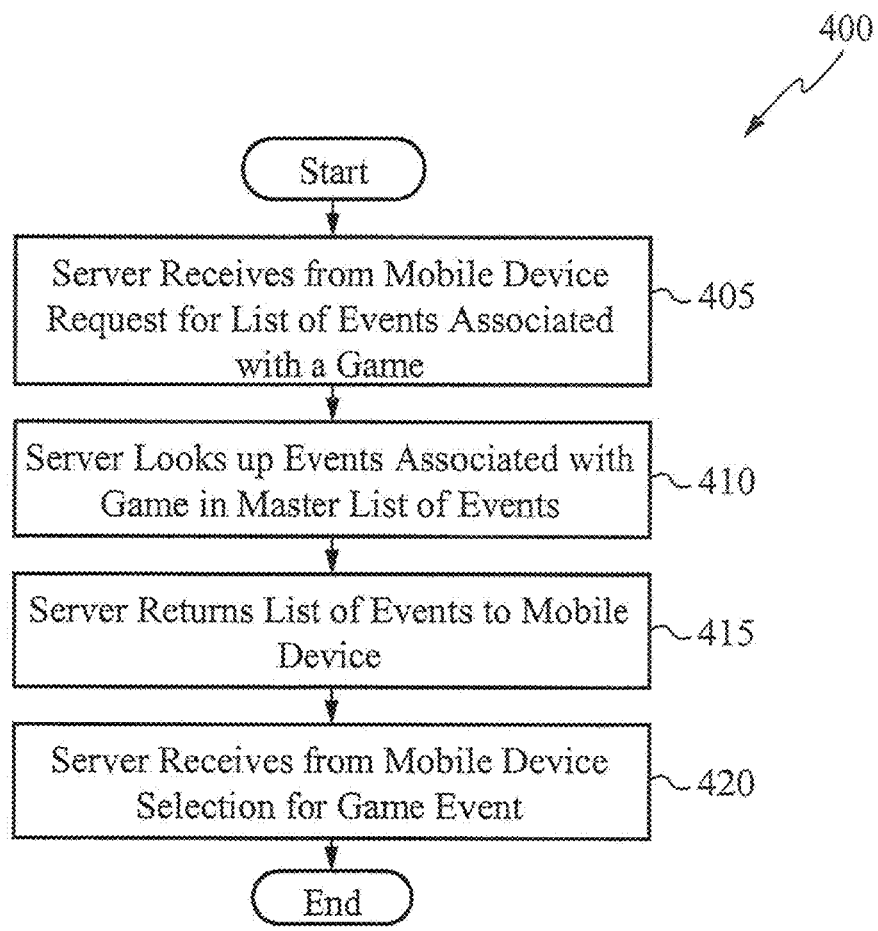
FIG. 4 illustrates a process flow for a server sending a list of scheduled events for a network game.

As mentioned above, the mixed network topology 100 illustrated in FIG. 1 employs a server 105 to operate and officiate a game that is provided to a set of heterogeneous mobile devices. As discussed above in relation to FIG. 2, the games begin by a participant selecting a game event through a mobile device, and by the mobile device requesting a list of hosted game events. FIG. 4 illustrates a server hosting process 400 for a server sending a list of scheduled events for a network game. As shown in FIG. 4, the hosting process 400 begins at the step 405 where the server receives from a mobile device, a request for a list of events associated with a game. Then the process 400 transitions to the step 410 where the server looks up events associated with the game in a master list of games and events. For instance, for the game of "football" the master list of games and events might include the "Super Bowl" as an event. This master list is maintained by some embodiments on a data storage. At the step 415, the server returns the list of events to the requesting mobile device and waits for the mobile device to make a selection. At the step 420, the server receives from the requesting mobile device a selection for a game event and then the hosting process 400 concludes.

Once the server of some embodiments receives the selection of a game event from a requesting mobile device, the server performs certain setup operations for the requested game event. In some embodiments, the server logs the mobile device and/or the participant operating the mobile device to one or more data storages maintained by the server. The server of some embodiments may request the identification explicitly, while the mobile device of other embodiments will transmit the identification separately, or in conjunction with another message to the server regardless of a specific identification request.

Figure 5:
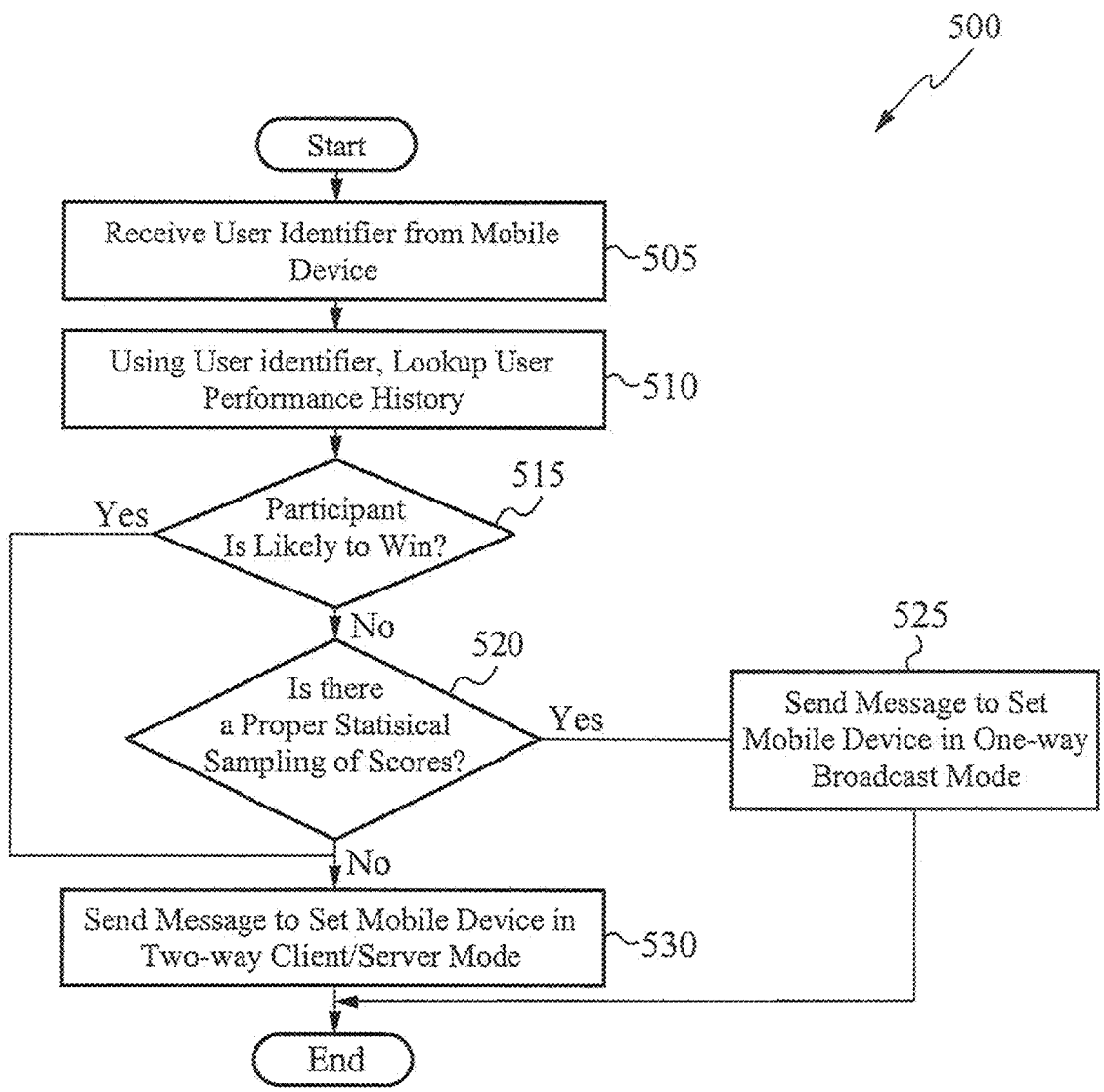
FIG. 5 illustrates a process flow for a server setting up a network game.

FIG. 5 illustrates a process 500 for a server setting up a network game. The server setup process 500 begins at the step 505 when the server receives identification from the mobile device. As mentioned, this identification can represent a participant and/or the participant's mobile device. At the step 510 the server uses the received identifier to look up the performance history associated to the received identifier. The server of some embodiments may use a data storage for the lookup. Then, the process 500 transitions to the step 515, where the process 500 determines based on the participant's performance history, whether the participant is likely to win. The determination of some embodiments may be an approximation of performance for the selected game event, particularly if little or no performance history has been logged to the data storages for the particular participant.

If at the step 515, the participant is likely to win, then the server setup process 500 transitions to the step 530 where the server sends a message to set the mobile device in a two-way client/server communications mode. In the two-way mode, the server monitors closely the participant's performance for the game event. In these embodiments, the server is constantly updated with only the most relevant data from a subset of participants who are likely to win. Otherwise, if at the step 515, the participant is not likely to win, then the process 500 transitions to the step 520, where the process 500 determines whether there is a proper statistical sampling of scores.

In some embodiments, the server setup process 500 determines whether the number of two-way (real-time) connections to the server is statistically significant, meaning that the number of connections is sufficient to provide a reasonably reliable representation of the population of all participants in the game event. If at the step 520, there is not a proper statistical sampling (e.g., there are not enough two-way connections for statistical significance) then the process 500 transitions to the step 530 where the server sends a message to set the mobile device in two-way client/server mode (thus, increasing the number of two-way connections toward statistical significance), and the process 500 concludes. Otherwise, the process 500 transitions to the step 525 where the server sends a message to set the mobile device in one-way mode to receive broadcasts from the server, and the server setup process 500 concludes. As mentioned above, some embodiments pre-select a set of sampling participants for two-way connections at the start of each game.

Figure 6:
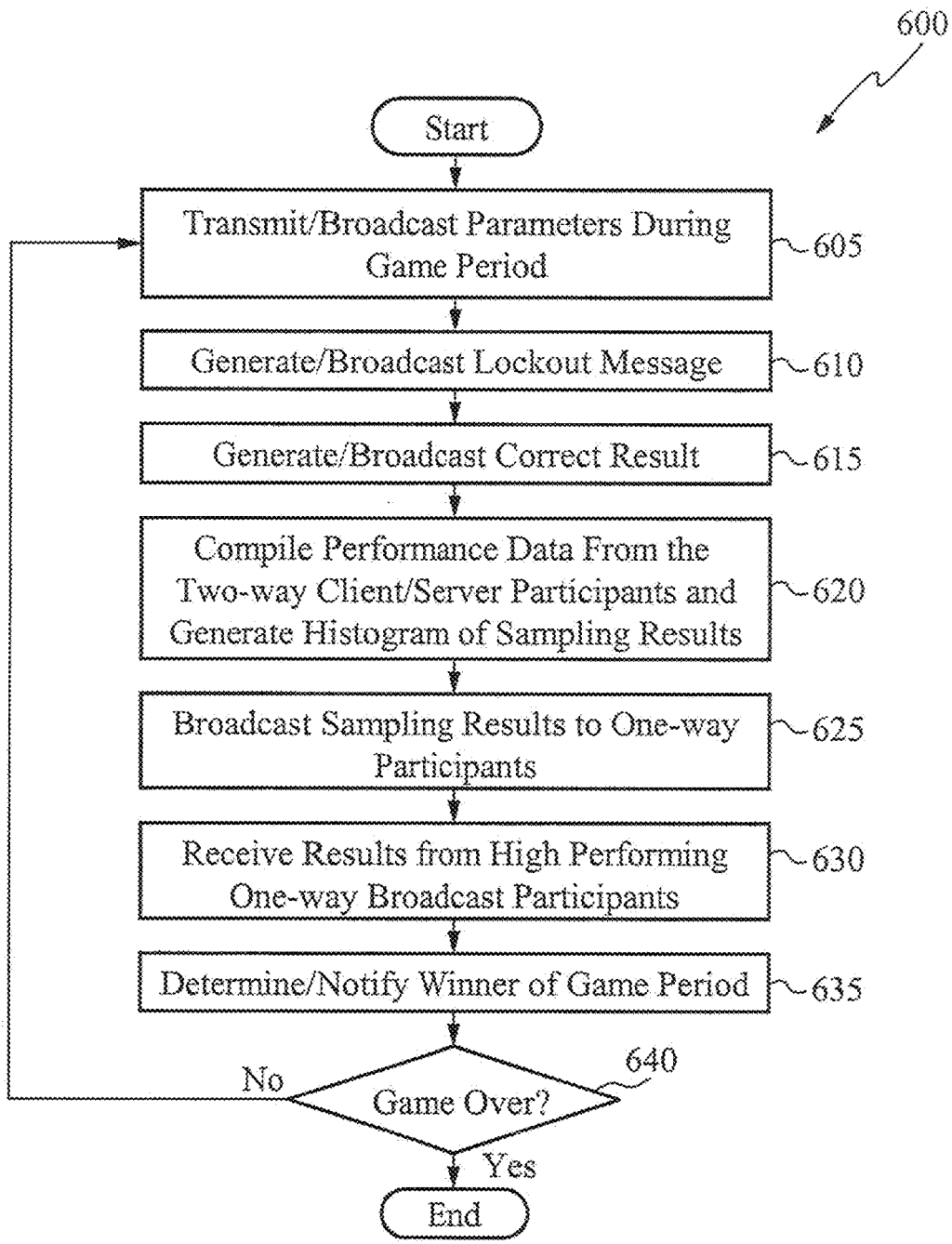
FIG. 6 illustrates a process flow for a server officiating a network game.

Once the server has set up and sent the mobile device configuration messages for the selected game, the server will then typically conduct and officiate the game. FIG. 6 illustrates a process 600 for a server officiating a network game. As shown in this Figure, the server operation process 600 begins at the step 605 where the server transmits parameters and other information regarding the game to any mobile devices that have selected participation for the game period. For the mixed topology 100 illustrated in FIG. 1, mobile devices configured for one-way mode will typically receive the game information through broadcast messages from the server, while mobile devices configured for two-way mode will send and receive in a manner that is typical of client/server connections.

The transmissions and/or broadcasts will continue at the step 605 until the conclusion of the game period as determined by the particular game parameters. Then the process 600 transitions to the step 610 where the server generates and sends a lockout message to notify the participating or subscribed mobile devices that the game period has concluded. In some embodiments, the lockout message includes a timestamp. After the lockout message, the server generates and sends the correct result for the recently concluded game period at the step 615. Then the process 600 transitions to the step 620 where the server compiles the available performance data from the two-way client/server mode participants. As mentioned above, in some embodiments the two-way mode participants form a representative sample of all participants competing during the particular game period. The server operation process 600 of some embodiments generates a graphical representation of the results obtained from the representative sample of participants. Some of these embodiments use a histogram format to illustrate the sampling results.

Once the server operation process 600 compiles the sampling results at the step 620, the process 600 transitions to the step 625 where the server sends the sampling results to the participants of the game period. In particular, the server typically broadcasts the sampling results to the one-way mode participants. After broadcasting the sampling results, the process 600 transitions to the step 630 where the server receives uploaded results from the high performing one-way mode participants. As described above in relation to FIG. 3, in some embodiments the high performing one-way mode participants determined their status as high performers based on the sampling results received from the server, and only those participants who were likely to win the game event or period upload their results to the server.

As shown in FIG. 6, after the step 630, the server operation process 600 transitions to the step 635 where the process 600 may perform a number of functions. For instance, the process 600 of some embodiments determines and/or notifies one or more winners of the current game event or period. The process 600 of some embodiments also makes determinations or calculations as to the categories and criteria for winners of the game event and/or period. Thus, for each discrete period a participant's score may increment or decrement by the appropriate number of points depending on the game rules. Some embodiments calculate a total and/or cumulative score for the particular participant. The details of the discrete period and the scoring typically encompasses the underlying facets of the game's subject matter such as, for example, the answer to a televised Jeopardy® question, or the results of a prediction of what play will be called by the quarterback in a televised football game.

When the server operation process 600 completes the various tasks at the step 635, the process 600 transitions to the step 640 where the process 600 determines whether the game, the event, and/or the period are over, based on a set of criteria specific to the selected game. If the game is not over, then the server operation process 600 returns to the step 605, otherwise the process 600 concludes. As one of ordinary skill will recognize, the officiating server during an online network game does not monitor a majority of the participants, particularly the one-way broadcast participants. In a network environment of heterogeneous mobile devices, this creates opportunities for participants to unfairly modify and report their performance.

As mentioned above, games broadcast to mobile devices pose specific challenges as to data validation and overall game integrity. For example, a participant using a mobile device in an online or network game is able to (1) access the mobile device client to probe the microprocessor, and/or the RAM to modify the local data at the client device; (2) "spoof" or emulate another mobile client device or; (3) apply other techniques to enter predictions after the answers are known. Thus, a crafty participant is able to create game scores that are not legitimately achieved out of view of the officiating secure server and submit the unfairly achieved performance for scoring against un-enhanced legitimate competitors.

To cope with this issue, some embodiments provide a method and system for detecting unusual performance in a game. The game has a participant. In some embodiments, the game is a game of skill, which, as with most games of skill, performance improves with repetitive play, until a participant reaches their general level of skill. The method calculates for the participant an average performance level. Based on the average performance level, the method tracks for the participant, a participant improvement factor and stores the participant improvement factor. The method compares the participant improvement factor to a threshold value. As mentioned above, some embodiments make this comparison at step 345, of the process flow 300, illustrated in FIG. 3.

Some embodiments additionally track a game improvement factor (e.g., at step 635 in FIG. 6). In some of these embodiments the game improvement factor includes the average change in performance over time for all participants of the game. In some embodiments, any participant whose current game performance is exceeding either the overall game improvement factor, and/or the individual's participant improvement factor, or who is achieving a score at the very highest level of the current online players, will trigger the establishment of a two-way connection with the server for closer two-way monitoring of the participant's activity during the remainder of the game. Additionally, participants who approach a level of performance sufficient to win a significant prize, tournament points, or other reward, are also selected by some embodiments for a two-way server connection at various times during their participation of a network game. The two-way connection employs the transport control protocol (TCP) in some embodiments, while other embodiments might employ another suitable protocol. The server of some embodiments is a "game session server" provided by AirPlay Network, Inc.

Once a two-way connection is triggered, the server of some embodiments records data for the ongoing game play of the triggering participant and performs a variety of tests. The tests of some embodiments include the recording of each entry by the participant, and examining the time stamp, user input, and other data being received from the participant's mobile device. Some embodiments use the recorded data to identify anomalies in the participant's activities. The anomalies might include (1) abnormal improvement in results relative to other participants, (2) abnormal improvement in performance based an prior performance for the particular participant, (3) signs that the application software has been altered, (4) anomalies in the utilization of the game control interface, and/or (5) indications through encryption and additional non-obvious data that the final score upload has been altered.

Some embodiments, when detecting an anomaly, require future game play by the participant suspected of unfair activity to be conducted on a two-way basis with the server for close monitoring. For instance, during the game play of these embodiments, every play prediction is stored inside the mobile device and is sent periodically to the game server. Moreover, some embodiments store in a database, each participant's relative performance for each game in which the participant competes. In some embodiments, the participant's relative performance is stored in the form of a percentile standing. Some embodiments calculate and store the average performance level and the average incremental improvement in the percentile standing for each participant. As participants improve over time with practice and experience, some embodiments continually calculate an average improvement factor for both the game in general, as well as for a specific participant. For instance, the average improvement in percentile standing of a specific participant for a particular game might be two percentile points, while the average improvement for a group of participants at a particular skill level game-wide, might be three percentile points.

Thus, the threshold value used by some embodiments to gauge a participant's performance may vary for each participant, and for each game, and may also vary over time. The threshold values of these embodiments are adjusted based on one or more of these or other factors (e.g., the participant and game factors, over time). Moreover, some embodiments employ multiple checks against one or more of the threshold values. For instance, the participant's improvement may not be that notable based on the participant's history but is unusual for the particular game played.

In some embodiments, information regarding the average improvement in percentile standing for a participant and/or for the group of participants within a particular skill level for the game is stored to the participant's mobile device by using software that has been loaded into the participant's mobile device memory and/or that has been downloaded with an application's program. These embodiments continuously compare each participant's current percentile standing to the stored information that includes the improvement factors previously described.

For some embodiments, information is updated in real-time. This includes updating the sampling distribution representing the game-wide performance through the (realtime) two-way connections, as well as updating the broadcast participants utilizing the one-way connections. Also previously mentioned, during play of the game, performance or scoring information may be represented in some embodiments by a histogram format, which may be displayed at various times on the participant's mobile device. The histogram of these embodiments may contain the performance of a random sample of selected participants who are continually connected to the server. In some embodiments, the mobile device might generate the histogram, while for other embodiments, the histogram is broadcast to all participants by the server. The point values to win for each game being played is different and depends upon the following, among other things: the game; the difficulty of the game; and the performance of the players playing the game. Thus, the histogram is used to track the scores of a sampling of the players and communicate those scores to all of the players during the game. Each mobile device will then be able to determine bow the corresponding player is performing in the current game relative to the other players.

Figure 7:
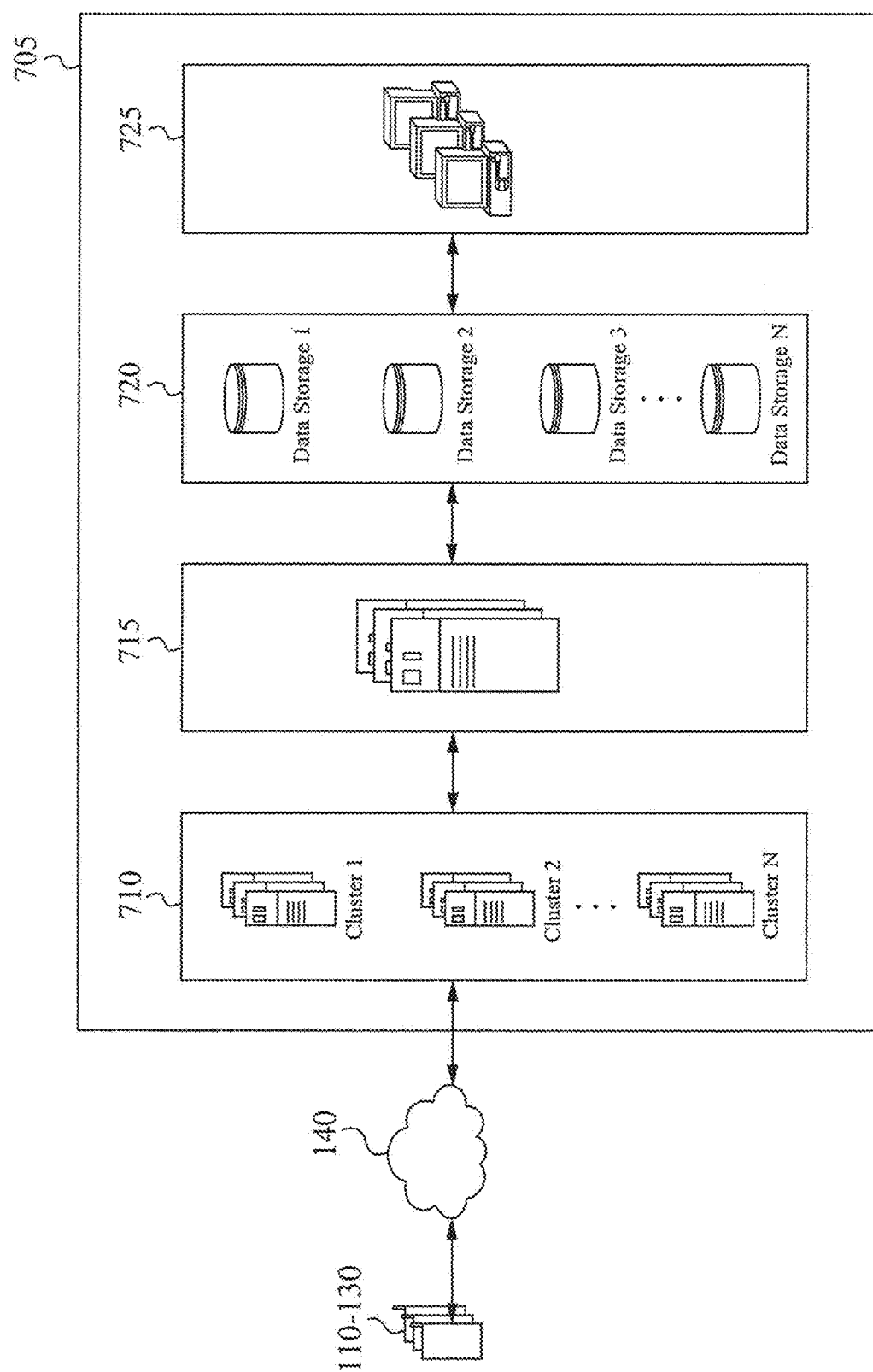
FIG. 7 illustrates the system implemented by some embodiments.

As previously mentioned, the server 105 illustrated in FIG. 1 is implemented in some embodiments by using a more complex system that includes multiple servers and/or multiple server clusters. To further illustrate this scalability feature, the server of some embodiments is depicted in FIG. 7 as a cluster or several clusters of server computers. Accordingly, FIG. 7 illustrates a system 705 implemented by some embodiments that includes a communication layer 710, a master layer 715, data storages 720, and administration tools 725. Further shown in FIG. 7, one or more mobile devices 110-130 connect to the system 705 through a network 140. As previously mentioned, the network 140 in some embodiments includes a mobile device network such as a cellular network, which employs a variety of communications protocols to transmit data both one-way and two-way between the mobile devices 110-130 and the system 705.

In some embodiments, initial messages received by the system 705 are handled by the communication layer 710. In these embodiments, the communication layer 710 might include dedicated servers to handle the communication needs of a large scale hosted network game. For instance, the communication layer 710 of some embodiments includes a Connection Cluster, a Game Session Cluster, a Score Cluster, a Broadcast Cluster, and a Web Cluster, all provided by AirPlay Network, Inc. In these embodiments, the task of sending and receiving data in the processes of for example, setting up a game, providing an event list, providing game parameters during a game, and updating scores, is divided among the separate servers and/or clusters.

Also shown in FIG. 7, the communications layer 715 is coupled to a master layer 720. In some embodiments, the master layer 720 includes operational support for hosting and officiating the network games. In these embodiments, this hosted support might include server applications and functions for scheduling, registration, scoring, and validation. The master layer 720 often operates on massive amounts of data, thus each function in these embodiments is typically delegated to a dedicated collection of servers and/or clusters (e.g., a Schedule Cluster, a Registration Cluster, and a Scoring/Validation Cluster, also provided in some embodiments by Airplay Network, Inc.). The master layer 720 is further coupled to a set of data storages 720 to enable, for example, look ups into scheduling data such as a master schedule of games and events, user data such as participant and/or mobile device profiles and history, as well as prize data, results, metrics, and reporting data. Also shown in FIG. 7, the data storages 720 and the master layer 715 of some embodiments are coupled to a set of administration tools 725 that allow, for example, data entry and management such as scheduling and customer service functions. In these embodiments, the administration tools include user interfaces, terminals, and other appropriate administration means.

In the embodiments described above, each participant among potentially millions of participants may receive data on a one-way basis that indicates a highly accurate approximation of the participant's percentile standing after each event in real-time throughout the game. Some embodiments of the invention enable the server providing game control to utilize a one-way broadcast transmission for all but a small fraction of the participants, which significantly reduces the number of servers required to conduct a massive real time game. These embodiments also reduce the communications traffic on the cellular networks. These communications and infrastructure costs of operating the game could otherwise be insurmountable.

In addition to the benefit of providing current standings to all participants, the present invention also dramatically reduces the number of scoring calls both during and at the conclusion of an event, which represents a significant improvement over the art. The present invention establishes and maintains an ongoing two-way connection with a sample of participants throughout the game. The present invention monitors this sample and makes the information available game-wide in real-time. Therefore, the present invention does not require additional time to collect, process, and rebroadcast to the game participants instructions to later establish a two-way connection and upload scores for verification and ranking. Further, the present invention permits an almost immediate data collection, verification, and notification process, from only the most relevant group of participants in a game.

Moreover, the present invention addresses issues of integrity that are critical to a large-scale network game, which particularly may involve a number of mobile devices. A sponsor of such a large or network game offering may charge for the service and award prizes to winners. As mentioned above, the participation for such events can number potentially in the tens of millions of simultaneous subscribers, particularly by using the multicast mobile or cellular network configuration of some embodiments. However, such a game will draw little market response if the sponsor cannot maintain the integrity of the game. Issues of cheating may be addressed by employing two-way connections to closely monitor participants, but this quickly becomes impractical for large numbers of participants. Also, in some games based on rapidly unfolding events, such as a live telecast of a sporting event, the latency inherent in controlling a client utilizing a two-way connection (e.g., a cellular telephone) to a secure server makes keeping up with the telecast problematic. Some embodiments of the present invention incur the high overhead of two-way monitoring for only the set of participants who have a higher risk of cheating and/or have a high risk of winning. Such a system dramatically improves the economics of staging the network game and the quality of service for all the subscribed participants.

The present invention also provides for a system for enabling fair competition between people of similar experience or skill. It further provides for a system and method for promoting competitors to higher levels of competition as they improve with practice, knowledge and experience. The competitors are rewarded for improved performance by competing for greater prizes and being able to compete in more sophisticated and complex games by allowing modifications in the design of the game elements and rules themselves, where discrete elements of complexity are added to the games played at each higher skill level which are not available to players at a lower skill level.

A user starts out at the lowest tier of competition, where for example, he might be asked a minimal number of questions, thus keeping the game simple and fun so that the user is able to learn and perform well. By correctly answering questions and meeting a certain level of performance during the game, he is able to obtain a promotion to the next tier. Upon being promoted to the next tier of competition, the central game server determines at what tier the player is now playing and using the methods described below to cause the application software in the cell phone (client) to add levels of complexity to the game rules. Additional questions and/or increased opportunities for scoring are then provided to the user, providing more opportunities for points. Upon promotion, for example, to a third tier of skill, communication between the client and the central computer will modify software to allow the competitor to obtain an incrementing number of points for every consecutive correct prediction that they make without a wrong prediction. Preferably, the failure to make any prediction will not jeopardize this bonus. This further increases the level of sophistication of the underlying game by requiring the competitor to make a decision as to whether to venture a prediction at all. A wrong prediction would cancel an ever-increasing bonus for getting a growing number of plays, called correctly. This system also increases the total possible number of points which are able to be earned in the game at higher tiers of competition.

FIG. 8 illustrates an example of differences between each skill tier within some embodiments. In the example there are three tiers, Challenger 800, Champion 802 and Legend 804; however, the number of tiers in the example is not intended to limit the invention. Preferably, there are five tiers in the invention, but the invention is able to implement any number of tiers. The example also utilizes a football game, but any game that involves skill in predicting the outcome is able to be implemented with the present invention; hence the football game example should not, in any way, limit the invention.

In a football game, there are a number of situations where users are queried as to what they predict will occur next. The users are awarded points based upon their accuracy in their predictions.

In the Challenger tier 800, the user is asked two questions, for example, what the quarterback will call next and which direction the play will go. The optional answers for the play a quarterback will call are RUN or PASS and the directional choices are LEFT, MIDDLE or RIGHT. If the user is correct in choosing PASS and LEFT, when the actual play results in a pass to the left, then the user is awarded two points, for example.

In the Champion tier 802, the user is asked the same two questions as above for the Challenger tier 800, but additional opportunities to earn points are scalable as well. For instance, if a user picks RUN, he is then queried who the runner will be: QB, HB, FB or WR. Or if a user picks PASS, he is then queried who the receiver will be: WR1, WR2, WR3, TE or RB. Jersey numbers are able to be used instead of picking by position as well. The user is also queried as to what type of specific play will be called with options such as SNEAK, DRAW, SWEEP and BOOTLEG for a RUN play or SCREEN, DEEP OUT, SLANT and POST for a PASS play. With two additional questions, a user on the Champion tier 802 has an opportunity to obtain additional points. Thus, someone on the Champion tier 802 only needs to correctly choose fifty percent of the answers correctly to achieve the same number of points as a user on the Challenger tier 800 would if he picked one hundred percent of the answers correctly. Hence, there is no comparison of scores between players at the Champion and Challenger levels.

In the Legend tier 804, the user is asked the same questions asked to the Challengers and Champions, but is then asked additional questions as well. After a user answers the Champion tier 802 questions, the user is asked what the result of the play will be with possible answers of TD, FUMBLE, INT, SACK and FIRST DOWN. Furthermore, bonus points are earned for correctly answering questions in a row. Again, at the higher tier there are more opportunities to earn more points, such that a Legend only needs to correctly predict one third of the plays to receive the same score as if the Challenger predicted perfectly. Hence, Challenger users will know not only are they are not competing against Champion users for prizes, but their scores are not comparable because they do not have the same opportunities to obtain points. Thus there will be no discouragement that the Challenger has less points because it is not a fair comparison. A Challenger can only compare himself to other Challengers.

Finally, a greatly simplified system might be utilized, wherein trial subscribers, or new customers who have not established their relative skill yet, are able to play only the simplest version of the games. After conversion to full subscribership on sufficiently establishing their relative skill, they are enabled to play a more complex version of the game available at all the rest of the skill levels.

The example demonstrated in FIG. 8 should in no way limit the present invention. Although only two questions were used in the Challenger tier 800 and an additional two in the Champion tier 802 and then more in the Legend tier 804, any number of questions is able to be asked in each of the tiers.

FIG. 9 illustrates a set of example tiers. In this example, all players start off at a Challenger tier 900. Based on performance, the players have an opportunity to advance to Qualifier 902, Champion 904, Master 906 and Legend 908 tiers. As indicated, in conjunction with the first tier, the Challenger tier 900, there are also a number of subtiers for each major tier. In general, a tier promotion occurs if the player in a previous game has performed above a certain level. All of the foregoing is transparent to the user. The central computer system sets up the criteria for advancement from one skill tier to the next. The scores are analyzed to determine if any advancements are earned. A competition committee sets up advancement criteria for the game. Typical criteria would include, for example, the highest twenty five percent of the players scoring. As the players meet the advancement criteria, they advance to the appropriate tier.

There are two methods that are used to expose more advanced tiers of the game to the user. The first method is to have all of the possible skills available at all tiers already coded into the application. The application will expose to the users only the possible features of the game based on the user's skill tier. As the scores are maintained in either the central computer or the client, and the promotion criteria is met, a "promotion" message is broadcast by the central computer to the client. Through this message, the next tier of skill is automatically enabled on the client without communication back to the client or intervention by the subscriber. The customer is instantly enabled to play the more sophisticated game. Concurrently, software will also be enabled to cause the client's phone to receive the game play information on the results among those players now competing at the newly enabled skill tier.

Another method that will be used is to make sure that the user has the correct version of the application based on his skill tier. The user will initially download from the central server the application that corresponds to his skill tier. Once the user starts the application, the application checks to make sure that the skill tier matches the version of the application. If the application does not match the skill tier, the application downloads from the central server the correct version. The user will also be able to download the updated application once his is promoted to a new skill tier.

FIG. 10 illustrates an exemplary Graphical User Interface (GUI) 1000. The GUI 1000 enables users to view their scores. In the preferred embodiment, the scores are displayed based on the tiers of the game. In the example, the tiers include Legend, Master, Champion, Qualifier and Challenger tiers. Players are grouped under each tier. In the preferred embodiment, the players in different tiers did not have the same opportunities for points. Hence, there is no comparison between scores in the Legend tier and scores in the Challenger tier. Therefore, Newbie1 in the Challenger tier would not worry about those players in the tiers above him, because he is in first place in his tier and is doing better than anyone else with whom he is competing. Using the GUI 1000, a player is also able to manipulate how the data is shown. The example shows the scores in "Descending" order from highest to lowest. However, if a user knows he is closer to the bottom in points, he can choose to see the scores in "Ascending" order from lowest to highest. Furthermore, if a user is still having trouble finding his score another option is to sort the scores alphabetically "A-Z" or "Z-A" by players' names. In an alternative embodiment, the players in the different tiers have the same opportunity for points.

The example of FIG. 10 is not meant to limit the invention in anyway, although 5 tiers are shown and only three players are illustrated in each tier, there are able to be any appropriate number of tiers as well as any number of players within each tier. Furthermore, the scoring used in the example is not meant to limit the present invention in any way.

Figures 11A, 11B, 11C:
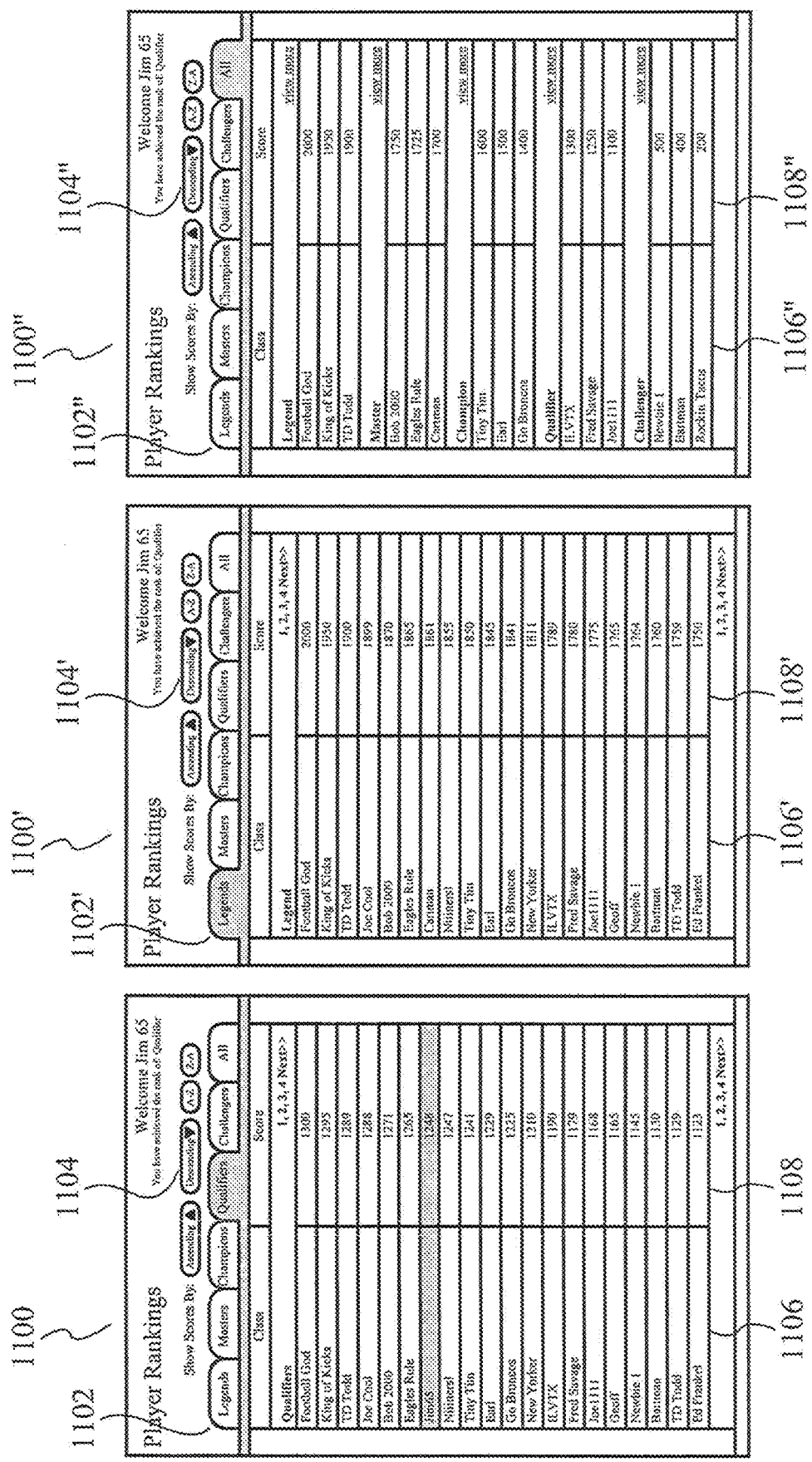

FIGS. 1A-C illustrate other exemplary GUIs 1100, 1100' and 1100". Each example displays a set of players based on a tab selected from a tab set 1102, 1102' and 1102" at the top of the screen. Typically the names of players in each tab set would be different, unlike the examples provided. In the examples, the tab sets 1102, 1102' and 1102" are based on the tiers of the game including Legend, Master, Champion, Qualifier and Challenger tiers. Each example shows different sets of rankings depending on the tab selected: the GUI 1100 shows rankings of Qualifiers, the GUI 1100' shows rankings of Legends and GUI 1100" shows All rankings. The Qualifiers' names 106 and corresponding scores 108 are displayed in a specified order. The order of the names and scores is based on a selectable sorting method chosen by the user via a set of buttons 1104, 1104' and 1104". Options for the sorting method include ascending score order, descending score order, alphabetically and reverse alphabetically. The present example in FIG. 11A illustrates the players' names 1106 in the Qualifiers tier sorted in descending order from the highest to the lowest scores 1108. FIG. 11B, illustrates the players' names 1106' in the Legends tier sorted in descending order from the highest to the lowest scores 1108'. FIG. 11C, illustrates the top 3 players' names 1106" in All tiers from the highest to the lowest scores 1108". If a user chooses to see more than the top 3 players' names, he is able to click a "view more" link to view a complete list. There is also an alert mechanism in the top right corner to inform the player of their current ranking such as Qualifier. The lists of player's names 1106 and scores 1108 are able to be displayed on one screen where the user scrolls down to view more or on a number of screens where the user clicks a link to go to the next page of listings. Furthermore, as FIGS. 11A-C are just examples, each page is able to be as interactive as desired including more links, tabs, buttons or any other interactive tool. The examples of FIGS. 11A-C are not meant to limit the invention in any way.

FIG. 12 illustrates an exemplary graphical user interface on a web page 1200. Within the web page 1200 are standard navigational techniques such as tabs, text links, image links, buttons and banner ads. Furthermore, the web page 1200 implements a customizable display which includes images, text fields, tables, tabs and more. The present invention includes any other navigational or display mechanism to fully provide an enjoyable experience for users of the system. As described above, the main display focuses on a list of names 1206 and their corresponding scores 1208. The list in the present example is displayed in descending order; however, the list is modifiable using a set of buttons 1204 to also display scores in ascending order, alphabetically or reverse alphabetically. Furthermore, presently the Qualifier tab is selected from the tab set 1202, but any of the tiers are selectable including All tiers. In the example, Jim65 is the user logged in, and he is viewing the Qualifier tier, the default tier, where his name is highlighted. Although the Qualifier tier is the default tier, the web page is modifiable to correspond with a user's preferences such that if the user prefers to go directly to the All scores page, then he is able to set that as the default. At the top of the screen is a navigational bar 1210 which allows easy navigation within the web site. Included on the navigational bar are links to Home, About Airplay, Our Games, Learn More and Tournament Prizes. The Home link takes the user to the Airplay home page. By clicking on About Airplay, a user is able to view information about Airplay. The Our Games link provides further information about other Airplay Games. Learn More is an informative page that describes a specified game in detail. The Tournament Prizes link explains the prizes available to players of the system. Along the sides of the screen are areas 1212 for more information including advertisements, updates or any other information that Airplay chooses to display to the user. Furthermore, along the bottom of the page is another location 1214 for information including banner ads, images of prizes, and any other information desired. When a user is finished viewing the web page he is able to logout by clicking on the Logout button, thereby securely ending his session and preserving his personal information. FIG. 12 provides an example of bow user's are able to view their information on a web pages and is not meant to limit the invention in any way.

To utilize the present invention, a number of steps are involved. A user must first download the software to his mobile device. The user then is able to communicate with the server via the software. The software queries the user if he wants to enter a game. The user selects a game to play where the game is coordinated with a live event such as a football game. The software prompts users to make predictions and the users select their answers at appropriate times. By selecting the proper choices, users earn points. If the user correctly answers a specified amount of questions and scores over a promotion threshold level, then the user will be promoted to the next tier to receive more advanced questions and more opportunities to earn points. Users are able to view and compare their scores with all other users even though the only comparison worth while is their score with others in the same tier as them. The scores are available to be viewed online or via the user's mobile device. Users are also able to win prizes based on how well they do in competitions.

There are numerous benefits of the present invention over the prior art. Instead of a system of skill tiers for a common game where the results of the competitors at different skill tiers would be known only to members of a specific group, the present invention allows all competitors to view all of the scores. The Internet allows subscribers of the service to view all results, and since all competitors competed in a single game in the prior art, users would directly compare all of their scores even Challengers with Legends. However, in the present invention, since at each discrete tier there is a separate copyrightable game, specifically designed with elements that allow increased point values at each skill tier, comparisons of one's score in the entry tier to the scores of the next highest tier, are meaningless. In its full embodiment, the games and the score potential are completely different at each tier. Competitors who will never advance far through the tiers of competition can be content to compete with people at their own skill tier. In a subscription-based business, the elimination of negative feedback from the comparison of one's score to those playing an identical game at a higher tier will increase customer satisfaction and correspondingly decrease customer "chum" or voluntary disconnect. A decrease by a small fraction in customer chum has significant impact on a service's profitability.

In addition, eliminating complex alternatives from the games played for entry tier competitors makes the games easier to lean, a fundamental requirement for the success of any game. On the other hand, a successful game must also be difficult to master. The present invention provides the incentive for a competitor who has now reached the top level of their tier, and is on the verge of promotion, the incentive of not only the opportunity to increase the level of prizes which can be won at their new level of skill, but rewards them by providing an increasingly richer game with more sophisticated decisions and challenges.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A server for conducting a game of skill played simultaneously by groups of participants, each participant on a client device, each group comprising a plurality of participants of a particular game skill tier, remote from each other in conjunction with at least one common game event wherein each participant player of a game receives one or more scores, the server comprising:
   a. a memory for storing program instructions for providing the common game event and transmitting the common game event to each of the remote participants and for defining a predetermined plurality of game skill tiers each comprising one or more players, wherein a competition for the game is based on the predetermined plurality of game skill tiers and an award amount, wherein the program instructions determine a current skill tier of a user and updates the current skill tier of the user if the current skill tier is not correct for the user, wherein the program instructions are implemented in real time, wherein the memory stores the game skill tier of each participant for each type of common game event, wherein one or more web-connected devices receive a first set of game data from the server, wherein the server receives a second set of game data from the one or more web-connected devices, wherein the first set of game data comprises questions relative to the predetermined plurality of game skill tiers such that each player belonging to a tier is asked a different level of question wherein all questions that are asked to lower tier players belonging to a lower tier are included among questions asked to higher tier players of one or more higher tiers, wherein the questions to the higher tier players also include one or more different questions than asked to the lower tier players; and
   b. a processor coupled to the memory to configure the second set of game data for the one or more web-connected devices, including setting up a two-way client/server relationship, wherein the two-way client/server relationship is only set up for a subset less than all of the one or more of the web-connected devices, wherein the server transmits a lockout signal to the one or more web-connected devices, wherein the lockout signal is transmitted at a designated time to prevent answers to questions after an outcome is known.

2. The server as claimed in claim 1, wherein the one or more web-connected devices are from a group including a cellular phone, a PDA, an MP3 player, and a laptop computer.

3. The server as claimed in claim 1, wherein the one or more web-connected devices or the server includes memory for permanently storing the game skill tier selected from the plurality of game skill tiers defined on the server.

4. The server as claimed in claim 1, wherein the one or more common game events comprise a live television broadcast of a live sporting event from a group including football, baseball, hockey, basketball, boxing, golf, soccer and auto racing.

5. The server as claimed in claim 1, wherein the one or more common game events are selected from a group including a televised game show, a reality show, an esports tournament and an entertainment show.

6. The server as claimed in claim 1, wherein the one or more common game events comprise a non-televised game selected from a group including cards, dice, word games, puzzles and trivia games.

7. The server as claimed in claim 1, wherein the one or more common game events are played on computers, the Internet, handhelds or cell phones.

8. The server as claimed in claim 1, wherein the game scores are communicated to the one or more players on a webpage.

9. The server as claimed in claim 1, wherein the game scores are communicated to the one or more players on the one or more web-connected devices, a computer or a video game device.

10. The server as claimed in claim 1, wherein all game scores are communicated to players regardless of game skill tier.

11. The server as claimed in claim 1, wherein all game scores in the game skill tier are communicated only to players included in the players' game skill tier.

12. The server as claimed in claim 1, wherein the games played at the relatively higher skill tiers have more game elements or more opportunities for points than respectively lower skill tiers.

13. The server as claimed in claim 1, wherein the server sends an acknowledgment in real time.

14. The server as claimed in claim 1 wherein the one or more web-connected devices comprise one or more mobile devices.

15. A method of controlling a game of skill or chance, comprising:
   a. transmitting one or more common game events from a server to one or more web-connected devices;
   b. defining a predetermined plurality of game skill tiers each comprising one or more players;
   c. transmitting game elements to the one or more players via the one or more web-connected devices, wherein the game elements are relative to the predetermined plurality of game skill tiers such that each player belonging to a tier is presented a different level of game element wherein all game elements that are presented to lower tier players belonging to a lower tier are included among game elements presented to higher tier players of one or more higher tiers, wherein the game elements presented to the higher tier players also include one or more different game elements than presented to the lower tier players;

d. determining a current skill tier of the user in an application and updating the application if the current skill tier is not correct for the user, thereby ensuring the user is utilizing an updated application that is correct for the user, wherein the application is implemented in real time, wherein the one or more web-connected devices receive a first set of game data from the server, wherein the server receives a second set of game data from the one or more web-connected devices, wherein a processor of the server configures the second set of game data for the one or more web-connected devices, including setting up a two-way client/server relationship, wherein the two-way client/server relationship is only set up for a subset less than all of a plurality of the one or more of the web-connected devices; and e. transmitting a lockout signal from the server to the one or more web-connected devices at a designated time to prevent answers to questions after an outcome is known.

16. The method as claimed in claim 15 further comprising:
promoting the one or more players to a relatively higher tier of the predetermined plurality of game skill tiers based on a determined level of a skill of a user;
determining a score for the one or more players based on the correctness of responses provided to the game elements;
grouping the scores for the one or more players according to the predetermined plurality of game skill tiers; and
displaying the scores within the predetermined plurality of game skill tiers in an order selected from a group including ascending, descending and alphabetical.

17. The method as claimed in claim 15, wherein the one or more web-connected devices are from a group including a cellular phone, a PDA, an MP3 player, and a laptop computer.

18. The method as claimed in claim 15, wherein the one or more web-connected devices include memory for permanently storing the skill tier selected from the predetermined plurality of game skill tiers.

19. The method as claimed in claim 15, wherein the one or more common game events comprise a live television broadcast of a live sporting event from a group including football, baseball, hockey, basketball, boxing, golf, soccer, esports tournaments and auto racing.

20. The method as claimed in claim 15, wherein the one or more common game events are selected from a group including a televised game show, a reality show and an entertainment show.

21. The method as claimed in claim 15, wherein the one or more common game events comprises a non-televised game selected from a group including cards, dice, word games, puzzles and trivia games.

22. The method as claimed in claim 15, wherein the one or more common game events are played on computers, the Internet, handhelds or cell phones.

23. The method as claimed in claim 15, wherein communicating the scores comprises posting the scores on a webpage.

24. The method as claimed in claim 15, wherein communicating the scores comprises sending the scores to the one or more web-connected devices, one or more computers or one or more video game devices.

25. The method as claimed in claim 15, further comprising communicating the tiers to the one or more users.

26. The method as claimed in claim 15, wherein more game elements are presented or more scoring opportunities offered and more points are awarded at the relatively higher skill tier.

27. The method as claimed in claim 15, further comprising utilizing the Internet for gameplay.

28. The method as claimed in claim 15, further comprising sending an acknowledgment from the server to the one or more web-connected devices in real time.

29. The method as claimed in claim 15, wherein the one or more web-connected devices comprise one or more mobile devices.

30. The method as claimed in claim 15, wherein the game elements comprise one or more questions.

31. A graphical user interface for displaying scores of a game of skill played by a plurality of players viewing one or more common game events, wherein the graphical user interface is stored in a non-transitory memory and displayed on a display of a device, wherein the graphical user interface is associated with an application, the graphical user interface comprising:

a. a representation of a plurality of tiers each comprising one or more players, the plurality of tiers comprising an initial skill tier and one or more advanced skill tiers, wherein initial players of the initial skill tier are asked one or more initial queries, and advanced players of at least one of the one or more advanced skill tiers are asked the one or more initial queries as well as at least one advanced query, wherein querying is relative to the plurality of tiers; and b. a list of a plurality of scores of the plurality of players, wherein each player has an associated tier, wherein the application is implemented in real time, including an acknowledgment by a server which is received by the device in real time, wherein the device receives a first set of game data from the server, wherein the server receives a second set of game data from the device, wherein a processor of the server configures the second set of game data for the device, including setting up a two-way client/server relationship, wherein the two-way client/server relationship is only set up for a subset less than all of a plurality of devices, wherein the server transmits a lockout signal to the device, wherein the lockout signal is transmitted at a designated time to prevent answers to the questions after an outcome is known.

32. The graphical user interface as claimed in claim 31, wherein the plurality of players play a game with the same opportunities to score points.

33. The graphical user interface as claimed in claim 31, wherein the plurality of players play a game with different opportunities to score points.

34. The graphical user interface as claimed in claim 31, wherein the plurality of scores are displayed in an order selected from a group including ascending, descending and alphabetical.

35. The graphical user interface as claimed in claim 31, wherein the scores for each player are listed in the associated one of the plurality of tiers.

* * * * *

UNITED STATES PATENT AND TRADEMARK OFFICE
CERTIFICATE OF CORRECTION

PATENT NO. : 10,933,319 B2
APPLICATION NO. : 16/266081
DATED : March 2, 2021
INVENTOR(S) : David B. Lockton et al.

Page 1 of 1

It is certified that error appears in the above-identified patent and that said Letters Patent is hereby corrected as shown below:

In the Specification

At Column 19, Line 26, please replace "FIGS. 1A-C" with – FIGS. 11A-C –

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*